US010699528B2

(12) United States Patent
Leen et al.

(10) Patent No.: US 10,699,528 B2
(45) Date of Patent: Jun. 30, 2020

(54) SYSTEM FOR ESTABLISHING A WAGER FOR A GAME

(75) Inventors: Fergus A. Leen, Wimbledon Park (GB); Sam B. Lawrence, London (GB); David G. McNally, Wimbledon (GB); Clive Hetherington, Huddersfield (GB); David M. McDowell, London (GB); Kevin R. O'Neal, London (GB)

(73) Assignee: INTERACTIVE GAMES LIMITED, London (GB)

( * ) Notice: Subject to any disclaimer, the term of this patent is extended or adjusted under 35 U.S.C. 154(b) by 0 days.

(21) Appl. No.: 11/335,210

(22) Filed: Jan. 18, 2006

(65) Prior Publication Data

US 2006/0116199 A1 Jun. 1, 2006

Related U.S. Application Data

(63) Continuation of application No. 10/193,980, filed on Jul. 12, 2002, now Pat. No. 8,672,751.

(Continued)

(51) Int. Cl.
*A63F 13/00* (2006.01)
*G07F 17/32* (2006.01)

(52) U.S. Cl.
CPC .......... *G07F 17/3255* (2013.01); *G07F 17/32* (2013.01); *G07F 17/323* (2013.01);
(Continued)

(58) Field of Classification Search
CPC .... G07F 17/32; G07F 17/323; G07F 17/3223; G07F 17/3237; G07F 17/3274;
(Continued)

(56) References Cited

U.S. PATENT DOCUMENTS 2,026,082 A 12/1935 Darrow
3,224,773 A 12/1965 Roed
(Continued)

FOREIGN PATENT DOCUMENTS

EP 1658887 5/2006
GB 2262642 6/1993
(Continued)

OTHER PUBLICATIONS

Myth II: Soulblighter [online], Copyright 1999 [retreived Jul. 11, 2007]. Retrieved from the Internet:< URL: http://public.planetmirror.com/pub/replacementdocs/Myth_II_-_Soulblighter_-_Manual_-_PC.pdf>.*

(Continued)

*Primary Examiner* — Allen Chan

(57) ABSTRACT

In a particular embodiment of the present invention, a system for establishing a wager associated with a game comprises one or more web servers that provide access to an online game for a plurality of users. The system further comprises one or more processors that receive information about a wager offer, wherein the wager offer is associated with the online game. The one or more processors also receive information about a wager acceptance. The wager offer and the wager acceptance combine to form a wager, wherein the wager is associated with at least one wager parameter. The system further comprises a memory communicatively coupled to the one or more processors and that stores information associated with the at least one wager parameter.

11 Claims, 10 Drawing Sheets

158

| 300 RECORD ID | 302 USER ID | 304 USER ID | 306 SERVER ID | 308 WAGER EVENT | 310 WAGER VALUE | 312 WAGER CONDITIONS |
|---|---|---|---|---|---|---|
| 1 | 3 | 204 | 3 | BIRDIE BY USER 3 ON 12th HOLE | $100 | ROUND 1 PLAY ONLY |
| 2 | 501 | 342 | 4 | USER 501 WILL FINISH LAP IN LESS THAN 59 SECONDS | $240 | 3 ATTEMPTS ONLY |
| ⋮ | ⋮ | ⋮ | ⋮ | ⋮ | ⋮ | ⋮ |
| N | 3 | 204 | 3 | SAND SAVE BY USER 3 ON 12th HOLE | $50 | ROUND 1 PLAY ONLY |

WAGER PARAMETERS

Related U.S. Application Data

(60) Provisional application No. 60/305,149, filed on Jul. 13, 2001, provisional application No. 60/323,597, filed on Sep. 20, 2001, provisional application No. 60/305,151, filed on Jul. 13, 2001, provisional application No. 60/305,150, filed on Jul. 13, 2001, provisional application No. 60/305,147, filed on Jul. 13, 2001, provisional application No. 60/305,146, filed on Jul. 13, 2001, provisional application No. 60/323,598, filed on Sep. 20, 2001.

(52) U.S. Cl.
CPC ...... *G07F 17/3223* (2013.01); *G07F 17/3225* (2013.01); *G07F 17/3227* (2013.01); *G07F 17/3234* (2013.01); *G07F 17/3237* (2013.01); *G07F 17/3239* (2013.01); *G07F 17/3244* (2013.01); *G07F 17/3276* (2013.01); *G07F 17/3286* (2013.01); *G07F 17/3293* (2013.01)

(58) Field of Classification Search
CPC ............. G07F 17/3276; G07F 17/3279; G07F 17/3288; G07F 17/3295; G07F 17/3255; G07F 17/3227; G07F 17/3234; G07F 17/3239; G07F 17/3244; G07F 17/3286; G07F 17/3293
USPC ....................................................... 463/25, 28
See application file for complete search history.

(56) References Cited

U.S. PATENT DOCUMENTS

| | | | | |
|---|---|---|---|---|
| 3,856,308 | A | 12/1974 | Breslow et al. | |
| 3,895,804 | A | 7/1975 | Lee | |
| 4,053,157 | A | 10/1977 | Cowan | |
| 4,058,319 | A | 11/1977 | Thomas et al. | |
| 4,141,548 | A | 2/1979 | Everton | |
| 4,323,248 | A | 4/1982 | Zingale | |
| 4,339,798 | A | 7/1982 | Hedges et al. | |
| 4,569,526 | A | 2/1986 | Hamilton | |
| 4,592,546 | A | 6/1986 | Fascenda et al. | |
| 4,666,160 | A | 5/1987 | Hamilton | |
| 4,819,818 | A | 4/1989 | Simkus et al. | 273/138 |
| 4,881,740 | A | 11/1989 | Odhner | |
| 4,883,636 | A | 11/1989 | Fantle, Jr. | |
| 5,085,441 | A | 2/1992 | Jova | |
| 5,141,234 | A | 8/1992 | Boylan et al. | 273/306 |
| 5,167,010 | A | 11/1992 | Elm et al. | 395/50 |
| 5,179,517 | A | 1/1993 | Sarbin et al. | 364/410 |
| 5,238,249 | A | 8/1993 | Elias et al. | 172/128 |
| 5,314,194 | A | 5/1994 | Wolf | 273/292 |
| 5,340,113 | A | 8/1994 | Respicio | |
| 5,350,175 | A | 9/1994 | DiLullo et al. | 273/146 |
| 5,370,397 | A | 12/1994 | Miller, Jr. et al. | |
| 5,397,128 | A | 3/1995 | Hesse et al. | 273/292 |
| 5,494,296 | A | 2/1996 | Grassa | 273/292 |
| 5,507,485 | A | 4/1996 | Fisher | 273/32 |
| 5,507,489 | A | 4/1996 | Reibel et al. | |
| 5,558,339 | A | 9/1996 | Perlman | |
| 5,573,244 | A | 11/1996 | Mindes | |
| 5,575,474 | A | 11/1996 | Rossides | |
| 5,586,257 | A | 12/1996 | Perlman | |
| 5,636,209 | A | 6/1997 | Perlman | |
| 5,669,817 | A | 9/1997 | Tarantino | |
| 5,673,917 | A | 10/1997 | Vancura | 273/292 |
| 5,676,375 | A | 10/1997 | Pirouzkhah | 273/274 |
| 5,749,785 | A | 5/1998 | Rossides | 463/25 |
| 5,769,714 | A | 6/1998 | Wiener et al. | |
| 5,795,226 | A | 8/1998 | Yi | |
| 5,810,360 | A | 9/1998 | Srichayaporn | 273/292 |
| 5,826,976 | A | 10/1998 | Skratulia | 364/412 |
| 5,828,843 | A | 10/1998 | Grimm et al. | 398/200.58 |
| 5,842,921 | A | 12/1998 | Mindes et al. | |
| 5,868,392 | A | 2/1999 | Kraft | 273/292 |
| 5,879,007 | A | 3/1999 | Kasri | 273/292 |
| 5,911,419 | A | 6/1999 | Delaney et al. | 273/292 |
| 5,934,675 | A | 8/1999 | Handelman et al. | 273/292 |
| 5,944,315 | A | 8/1999 | Mostashari | 273/292 |
| 5,947,821 | A | 9/1999 | Stone | 463/13 |
| 5,956,485 | A | 9/1999 | Perlman | |
| 5,971,854 | A | 10/1999 | Pearson et al. | |
| 5,999,808 | A | 12/1999 | LaDue | |
| 6,007,427 | A | 12/1999 | Wiener et al. | |
| 6,024,643 | A | 2/2000 | Begis | 463/42 |
| 6,036,601 | A | 3/2000 | Heckel | 463/42 |
| 6,062,565 | A | 5/2000 | Chadband et al. | 273/292 |
| 6,068,552 | A | 5/2000 | Walker | 463/21 |
| 6,070,878 | A | 6/2000 | Jones et al. | 273/309 |
| 6,102,403 | A | 8/2000 | Kaufman | 273/292 |
| 6,106,395 | A | 8/2000 | Begis | 463/23 |
| 6,113,495 | A | 9/2000 | Walker et al. | 463/42 |
| 6,116,601 | A | 9/2000 | Kornafel, Jr. | |
| 6,119,229 | A | 9/2000 | Martinez et al. | 713/200 |
| 6,120,031 | A | 9/2000 | Adams | 273/292 |
| 6,135,453 | A | 10/2000 | Srichayaporn | 273/292 |
| 6,146,272 | A | 11/2000 | Walker et al. | 463/17 |
| 6,158,741 | A | 12/2000 | Koelling | 273/292 |
| 6,174,235 | B1 | 1/2001 | Walker et al. | 463/25 |
| 6,176,487 | B1 | 1/2001 | Eklund et al. | 273/249 |
| 6,203,017 | B1 | 3/2001 | Schultz | |
| 6,204,813 | B1 | 3/2001 | Wadell et al. | |
| 6,206,373 | B1 | 3/2001 | Garrod | 273/292 |
| 6,227,969 | B1 | 5/2001 | Yoseloff | 463/13 |
| 6,241,524 | B1 | 6/2001 | Aoshima | |
| 6,286,833 | B1 | 9/2001 | Collins | |
| 6,305,689 | B1 | 10/2001 | Webb | 273/292 |
| 6,322,451 | B1 | 11/2001 | Miura | 463/42 |
| 6,325,716 | B1 | 12/2001 | Walker et al. | 463/17 |
| 6,341,778 | B1 | 1/2002 | Lee | 273/292 |
| 6,352,479 | B1 | 3/2002 | Sparks, II | 463/42 |
| 6,371,485 | B1 | 4/2002 | Daines | 273/303 |
| 6,394,899 | B1 | 5/2002 | Walker | |
| 6,402,149 | B1 | 6/2002 | Chou | 273/292 |
| 6,434,398 | B1 | 8/2002 | Inselberg | |
| 6,439,573 | B1 | 8/2002 | Sklar | 273/292 |
| 6,460,848 | B1 | 10/2002 | Soltys et al. | 273/149 |
| 6,464,583 | B1 * | 10/2002 | Kidron | 463/25 |
| 6,481,714 | B1 | 11/2002 | Jacobs | |
| 6,485,020 | B1 | 11/2002 | Broadnax | 273/292 |
| 6,503,145 | B1 | 1/2003 | Webb | 463/16 |
| 6,508,710 | B1 | 1/2003 | Paravia et al. | 463/42 |
| 6,511,377 | B1 | 1/2003 | Weiss | 463/25 |
| 6,520,856 | B1 | 2/2003 | Walker et al. | 463/21 |
| 6,523,829 | B1 | 2/2003 | Walker et al. | 273/292 |
| 6,536,767 | B1 | 3/2003 | Keller | 273/292 |
| 6,536,769 | B1 | 3/2003 | Palacios et al. | 273/292 |
| 6,540,230 | B1 | 4/2003 | Walker et al. | 273/292 |
| 6,561,902 | B1 | 5/2003 | Walker et al. | 463/25 |
| 6,569,014 | B2 | 5/2003 | Walker et al. | 463/13 |
| 6,569,015 | B1 | 5/2003 | Baerlocher et al. | 463/16 |
| 6,575,463 | B1 | 6/2003 | Wintersteen | |
| 6,575,465 | B2 | 6/2003 | Lo | 273/292 |
| 6,581,932 | B2 | 6/2003 | Jacobs | |
| 6,582,310 | B1 | 6/2003 | Walker et al. | 463/42 |
| 6,592,123 | B1 | 7/2003 | Mattlage et al. | |
| 6,601,048 | B1 | 7/2003 | Gavan et al. | |
| 6,602,136 | B1 | 8/2003 | Baerlocher et al. | |
| 6,612,580 | B1 | 9/2003 | Weldon | 273/292 |
| 6,616,142 | B2 | 9/2003 | Adams | 273/292 |
| 6,641,481 | B1 | 11/2003 | Mai et al. | 463/42 |
| 6,651,086 | B1 | 11/2003 | Manber et al. | 709/205 |
| 6,679,497 | B2 | 1/2004 | Walker et al. | |
| 6,692,003 | B2 | 2/2004 | Potter et al. | 273/274 |
| 6,708,975 | B1 | 3/2004 | Fox et al. | 273/292 |
| 6,733,387 | B2 | 5/2004 | Walker et al. | 463/17 |
| 6,755,420 | B2 | 6/2004 | Colton | |
| 6,758,754 | B1 | 7/2004 | Lavanchy | |
| 6,769,986 | B2 | 8/2004 | Vancura | 463/30 |
| 6,808,174 | B1 | 10/2004 | Rubin | 273/292 |
| 6,875,110 | B1 | 4/2005 | Crumby | 463/42 |
| 6,877,745 | B1 | 4/2005 | Walker et al. | 273/292 |
| 6,884,166 | B2 | 4/2005 | Leen et al. | 463/16 |

(56) References Cited

U.S. PATENT DOCUMENTS

| | | | | |
|---|---|---|---|---|
| 6,887,151 | B2 | 5/2005 | Leen et al. | 463/16 |
| 6,887,159 | B2 | 5/2005 | Leen et al. | 463/42 |
| 6,899,628 | B2 | 5/2005 | Leen et al. | 463/42 |
| 6,902,480 | B2 | 6/2005 | Kidron | |
| 6,910,965 | B2 | 6/2005 | Downes | |
| 6,929,264 | B2 | 8/2005 | Huard et al. | 273/274 |
| 6,966,832 | B2 | 11/2005 | Leen et al. | 463/16 |
| 6,979,267 | B2 | 12/2005 | Leen et al. | 467/42 |
| 7,004,834 | B2 | 2/2006 | Walker et al. | 463/16 |
| 7,021,623 | B2 | 4/2006 | Leen et al. | |
| 7,022,015 | B2 | 4/2006 | Mostashari | 463/12 |
| 7,029,394 | B2 | 4/2006 | Leen et al. | |
| 7,086,943 | B2 | 8/2006 | Mugnolo et al. | |
| 7,094,151 | B2 | 8/2006 | Downes | |
| 7,172,508 | B2 | 2/2007 | Simon et al. | |
| 7,240,093 | B1 | 7/2007 | Danieli | |
| 7,306,514 | B2 | 12/2007 | Amaitis et al. | |
| 7,306,516 | B2 | 12/2007 | Iosilevsky | |
| 7,361,085 | B2 | 4/2008 | Packes, Jr. et al. | |
| 7,410,422 | B2 | 8/2008 | Fine | |
| 7,523,941 | B2 | 4/2009 | Thomas et al. | |
| 7,585,217 | B2 | 9/2009 | Lutnick et al. | |
| 7,774,259 | B1 | 8/2010 | Satterfield | |
| 7,798,896 | B2 | 9/2010 | Katz et al. | |
| 7,833,101 | B2 | 11/2010 | Lutnick et al. | |
| 7,901,286 | B2 | 3/2011 | Reeves | |
| 8,025,565 | B2 | 9/2011 | Leen et al. | |
| 8,105,141 | B2 | 1/2012 | Leen et al. | |
| 8,266,212 | B2 | 9/2012 | Brunet de Courssou | |
| 8,556,691 | B2 | 10/2013 | Leen et al. | |
| 8,672,751 | B2 | 3/2014 | Leen et al. | |
| 8,684,840 | B2 | 4/2014 | Ishii | |
| 8,734,227 | B2 | 5/2014 | Leen et al. | |
| 8,821,269 | B2 | 9/2014 | Storm et al. | |
| 8,858,326 | B2 | 10/2014 | Amaitis et al. | |
| 9,005,016 | B2 | 4/2015 | Amaitis et al. | |
| 9,076,305 | B2 | 7/2015 | Amaitis et al. | |
| 9,111,417 | B2 | 8/2015 | Leen et al. | |
| 10,198,903 | B2 | 2/2019 | Amaitis et al. | |
| 10,223,871 | B2 | 3/2019 | Storm et al. | |
| 1,043,845 | A1 | 10/2019 | Amaitis et al. | |
| 10,522,003 | B2 | 12/2019 | Leen et al. | |
| 2001/0007828 | A1 | 7/2001 | Walker et al. | 463/26 |
| 2001/0009867 | A1* | 7/2001 | Sakaguchi | A63F 13/12 463/42 |
| 2001/0019965 | A1 | 9/2001 | Ochi | |
| 2001/0044339 | A1 | 11/2001 | Cordero et al. | 463/42 |
| 2002/0037767 | A1* | 3/2002 | Ebin | 463/25 |
| 2002/0058543 | A1 | 5/2002 | Walker et al. | 463/13 |
| 2002/0068633 | A1 | 6/2002 | Schlaifer | |
| 2002/0072412 | A1* | 6/2002 | Young et al. | 463/42 |
| 2002/0116263 | A1 | 8/2002 | Gouge | |
| 2002/0119824 | A1 | 8/2002 | Allen | 463/42 |
| 2002/0125639 | A1 | 9/2002 | Wells | 273/274 |
| 2002/0169019 | A1 | 11/2002 | Walker et al. | 463/17 |
| 2002/0198044 | A1 | 12/2002 | Walker et al. | 463/25 |
| 2003/0036428 | A1 | 2/2003 | Aasland | |
| 2003/0045358 | A1 | 3/2003 | Leen et al. | |
| 2003/0047871 | A1 | 3/2003 | Vancura | 273/374 |
| 2003/0050106 | A1 | 3/2003 | Lyfoung | 463/13 |
| 2003/0060276 | A1 | 3/2003 | Walker et al. | 463/25 |
| 2003/0064807 | A1 | 4/2003 | Walker et al. | 463/42 |
| 2003/0067116 | A1 | 4/2003 | Colton | |
| 2003/0069058 | A1 | 4/2003 | Byrne | 463/16 |
| 2003/0096646 | A1 | 5/2003 | Zhu | |
| 2003/0119579 | A1 | 6/2003 | Walker et al. | 463/20 |
| 2003/0139211 | A1 | 7/2003 | Mostashari | 463/12 |
| 2003/0144052 | A1 | 7/2003 | Walker et al. | 463/20 |
| 2003/0157976 | A1 | 8/2003 | Simon et al. | |
| 2003/0190941 | A1 | 10/2003 | Byrne | 463/16 |
| 2003/0216170 | A1 | 11/2003 | Walker et al. | 463/25 |
| 2003/0224852 | A1 | 12/2003 | Walker et al. | 463/20 |
| 2003/0234787 | A1 | 12/2003 | Hines | |
| 2004/0005919 | A1 | 1/2004 | Walker et al. | 463/23 |
| 2004/0015429 | A1 | 1/2004 | Tighe et al. | 705/37 |
| 2004/0053664 | A1 | 3/2004 | Byrne | 463/16 |
| 2004/0078208 | A1 | 4/2004 | Burwell | |
| 2004/0104845 | A1 | 6/2004 | McCarthy | |
| 2004/0227291 | A1 | 11/2004 | Van Rhyn | 273/274 |
| 2004/0229671 | A1 | 11/2004 | Stronach et al. | 463/6 |
| 2004/0231018 | A1* | 11/2004 | Olson | 902/23 |
| 2004/0259621 | A1 | 12/2004 | Pfeiffer et al. | 463/13 |
| 2005/0003893 | A1 | 1/2005 | Hogwood et al. | 463/42 |
| 2005/0040592 | A1 | 2/2005 | Adams, III | 273/139 |
| 2005/0051958 | A1 | 3/2005 | Snow | 273/274 |
| 2005/0059452 | A1 | 3/2005 | Hartl | |
| 2005/0082756 | A1 | 4/2005 | Duncan | 273/274 |
| 2005/0101386 | A1* | 5/2005 | Lavanchy | A63F 13/12 463/42 |
| 2005/0113161 | A1 | 5/2005 | Walker et al. | 463/13 |
| 2005/0116416 | A1 | 6/2005 | Peterson | 273/292 |
| 2005/0127607 | A1 | 6/2005 | Centrone | 273/292 |
| 2005/0151319 | A1 | 7/2005 | Berman et al. | 273/292 |
| 2005/0179201 | A1 | 8/2005 | DeSalvo | |
| 2005/0227757 | A1 | 10/2005 | Simon | |
| 2005/0275166 | A1 | 12/2005 | Wirth | 273/274 |
| 2005/0289039 | A1 | 12/2005 | Greak | |
| 2006/0017228 | A1 | 1/2006 | Chen | 273/292 |
| 2006/0025192 | A1 | 2/2006 | Walker et al. | 463/13 |
| 2006/0052148 | A1 | 3/2006 | Blair, Jr. et al. | 463/13 |
| 2006/0079314 | A1 | 4/2006 | Walker et al. | 463/20 |
| 2006/0079316 | A1 | 4/2006 | Flemming et al. | |
| 2006/0084501 | A1 | 4/2006 | Walker et al. | |
| 2006/0116198 | A1 | 6/2006 | Leen et al. | |
| 2006/0116200 | A1 | 6/2006 | Leen et al. | |
| 2006/0183522 | A1 | 8/2006 | Leen et al. | |
| 2006/0246990 | A1 | 11/2006 | Downes | |
| 2007/0135214 | A1 | 6/2007 | Walker et al. | |
| 2007/0135215 | A1 | 6/2007 | Walker et al. | |
| 2007/0155462 | A1 | 7/2007 | O'Halloran et al. | |
| 2007/0191107 | A1 | 8/2007 | Walker et al. | |
| 2007/0254732 | A1 | 11/2007 | Walker et al. | |
| 2007/0293289 | A1 | 12/2007 | Loeb | |
| 2007/0298856 | A1 | 12/2007 | Gilmore et al. | |
| 2008/0058048 | A1 | 3/2008 | Lutnick et al. | |
| 2008/0070667 | A1 | 3/2008 | Lutnick et al. | |
| 2008/0076544 | A1 | 3/2008 | Mindes et al. | |
| 2008/0085769 | A1 | 4/2008 | Lutnick et al. | |
| 2008/0113816 | A1 | 5/2008 | Mahaffey et al. | |
| 2008/0139316 | A1 | 6/2008 | He | |
| 2008/0161101 | A1 | 7/2008 | Lutnick et al. | |
| 2008/0191418 | A1 | 8/2008 | Lutnick et al. | |
| 2008/0207310 | A1 | 8/2008 | Mindes | |
| 2008/0214286 | A1 | 9/2008 | Lutnick et al. | |
| 2008/0234037 | A1 | 9/2008 | Leen et al. | |
| 2008/0248849 | A1 | 10/2008 | Lutnick et al. | |
| 2008/0254881 | A1 | 10/2008 | Lutnick et al. | |
| 2009/0037311 | A1 | 2/2009 | Omar | |
| 2009/0061974 | A1 | 3/2009 | Lutnick et al. | |
| 2009/0061978 | A1 | 3/2009 | Ahlin | |
| 2009/0083169 | A1 | 3/2009 | Ortega | |
| 2009/0088232 | A1 | 4/2009 | Amaitis et al. | |
| 2009/0093300 | A1 | 4/2009 | Lutnick et al. | |
| 2009/0111551 | A1 | 4/2009 | Faulkner | |
| 2009/0115654 | A1 | 5/2009 | Lo et al. | |
| 2009/0291732 | A1 | 11/2009 | Lutnick et al. | |
| 2010/0048302 | A1 | 2/2010 | Lutnick et al. | |
| 2010/0087247 | A1 | 4/2010 | Joshi et al. | |
| 2010/0105464 | A1 | 4/2010 | Storm et al. | |
| 2010/0124960 | A1 | 5/2010 | Lutnick et al. | |
| 2010/0124967 | A1 | 5/2010 | Lutnick et al. | |
| 2010/0160012 | A1 | 6/2010 | Amaitis et al. | |
| 2010/0197410 | A1 | 8/2010 | Leen et al. | |
| 2011/0009867 | A1 | 1/2011 | Oren et al. | |
| 2011/0034228 | A1 | 2/2011 | Lutnick et al. | |
| 2011/0065490 | A1 | 3/2011 | Lutnick et al. | |
| 2011/0275432 | A1 | 11/2011 | Lutnick et al. | |
| 2011/0281620 | A1 | 11/2011 | Hays | |
| 2012/0058813 | A1 | 3/2012 | Amaitis et al. | |
| 2012/0064969 | A1 | 3/2012 | Uchibori | |
| 2013/0130791 | A1 | 5/2013 | Myogan | |
| 2014/0179405 | A1 | 6/2014 | Leen et al. | |
| 2015/0024832 | A1 | 1/2015 | Leen et al. | |
| 2015/0174481 | A1 | 6/2015 | Tobin | |

(56) References Cited

U.S. PATENT DOCUMENTS

| | | | |
|---|---|---|---|
| 2015/0356830 | A1 | 12/2015 | Leen et al. |
| 2019/0122482 | A1 | 4/2019 | Amaitis et al. |
| 2019/0172318 | A1 | 6/2019 | Storm et al. |

FOREIGN PATENT DOCUMENTS

| | | | |
|---|---|---|---|
| WO | WO 97/44105 | | 5/1997 |
| WO | WO 9851384 | | 11/1998 |
| WO | WO 99/26204 | A1 | 5/1999 |
| WO | WO 00/32286 | | 8/2000 |
| WO | WO 00/79464 | A1 | 12/2000 |
| WO | WO 01/01319 | A1 | 1/2001 |
| WO | WO 01/05477 | A2 | 1/2001 |
| WO | WO 01/41447 | A1 | 6/2001 |
| WO | WO 02/060546 | | 12/2001 |
| WO | WO 2004/076011 | | 9/2004 |

OTHER PUBLICATIONS

"3 Quick Start," *EverQuest Manual* (3 pages), downloaded from http://eqlive.station.sony.com/manual/printfriendly.jsp?chapter=3 on Sep. 13, 2005.

"Sony Online Entertainment and NCsoft Join Force to Expand EverQuest®," *Game Development Search Engine*, (2 pages). Jan. 23, 2002.

"Butterfly.net: Powering next-generation gaming with on-demand computing," *IBM case study on Butterfly.net*, (12 pages), downloaded from http://www-306.ibm.com/software/success/cssdb.nsf/CS/AKLR-5GNU24?OpenDocument . . . on Sep. 20, 2005.

"Sony PlayStation 2 Online Adaptor," CNET.com, (4 pages). Release date Aug. 27, 2002.

"Playstation, Playstation 2," Answers.com (8 pages), downloaded from http://www.answers.com/main/ntquery;jsessionid=1n07siu6tfvdv?method=4&dsid=2222&d . . . on Sep. 8, 2005.

"E3 2002: All About Xbox Live," xbox.ign.com, (4 pages), May 20, 2002.

"Encyclopedia: EverQuest," natiomaster.com (7 pages) , downloaded from http://www.nationmaster.com/encyclopedia/EverQuest on Sep. 15, 2005.

"Sony Online Entertainment Continues to Lead the Online Gaming Industry With Its New Roster of Massively Multiplayer Games," *Press Releases at Sonyonline.com* (2 pages), May 13, 2002.

"Middleware Partners, Working with Game Components Suppliers," *Quazal Multiplayer Connectivity*, (1 page), downloaded from http://www.quazal.com/modules.php?op=modload&name-Sections&file=index&req=vie . . . on Sep. 13, 2005.

"Quazal Eterna, The Most Flexible Infrastructure for MMOG," *Quazal Multiplayer Connectivity*, (1 page), downloaded from http://www.quazal.com/modules.php?op= modload&name-Sections&file=index&req=vie . . . on Sep. 13, 2005.

"Quazal Rendez-Vous, A Flexible and Powerful Lobby Solution," *Quazal Multiplayer Connectivity*, (2 pages), downloaded from http://www.quazal.com/modules.php?op=modload&name-Sections&file=index&req=vie . . . on Sep. 13, 2005.

"Quazal Voice for Net-Z, Real-Time Voice Communications Made Easy," *Quazal Multiplayer Connectivity*, (1 page), downloaded from http://www.quazal.com/modules.php?op=modload&name-Sections&file=index&req=vie . . . on Sep. 13, 2005.

"Quazal SyncSim for Net-Z, Everything for Deterministic Simulations," Quazal Multiplayer Connectivity, (2 pages), downloaded from http://www.quazal.com/modules.php?op=modload&name-Sections&file=index&req=vie . . . on Sep. 13, 2005.

"Quazal Net-Z, Simplifying Multiplayer Game Development," *Quazal Multiplayer Connectivity*, (2 pages), downloaded from http://www.quazal.com/modules.php?op=modload&name-Sections&file=index&req=vie . . . on Sep. 13, 2005.

"GameSpy Arcade—The Arcade for the Internet!," *gamespy arcade*, (11 pages), downloaded from http://www.gamespyarcade.com/features/ on Sep. 13, 2005.

"Encyclopedia: MMORPG," nationmaster.com, (10 pages), downloaded from http://www.nationmaster.com/encyclopedia/MMORPG on Sep. 15, 2005.

"Online Gaming," *PlayStation*, (9 pages), downloaded from http://www.us.playstation.com/online gaming.aspx?id=index&PAGE=1 on Sep. 13, 2005.

"3rd Party Game Support," *PlayStation*, (5 pages) © 2005 Sony Computer Entertainment America Inc. 2005.

"Encyclopedia: MMORPG," nationmaster.com, (10 pages), downloaded from http://nationmaster.com/encyclopedia/MMORPG on Sep. 15, 2005.

"Online Gaming," *PlayStation*, (9 pages), downloaded from http://www.playstation.com/onlinegaming.aspx?id=index&PAGE=1 on Sep. 13, 2005.

*European Examination Report* for Application No. 02 764 684.3-2221; 4 pages, Oct. 12, 2004.

*European Examination Report* for Application No. 02 764 684.3-2221; 4 pages, Jun. 17, 2005.

*European Summons to Attend Oral Proceedings* for Application No. 02 764 684.3-2211; 26 pages, Feb. 14, 2006.

*European Decision to Refuse a European Patent Application* for Application No. 02 764 684.3-2211; 9 pages, Dec. 14, 2006.

Myth II Soulblighter; <URL: http://public.planetmirror.com/ pub/replacementdocs/Myth_II_-_Soulblighter_-_Manual_-_PC. pdf>; 24 pages, 1999.

*USPTO Office Action Summary* for U.S. Appl. No. 11/334,848, filed Jan. 18, 2006; 26 pages, Aug. 15, 2007.

*PCT Notification of Transmittal of the International Search Report* for International Application No. PCT/EP02/07806; 6 pages, Jan. 2, 2003.

*PCT Notification of Transmittal of the International Search Report* for International Application No. PCT/EP02/07807; 7 pages, Apr. 10, 2003.

*PCT Written Opinion* for International Application No. PCT/EP02/07807; 5 pages, Apr. 22, 2003.

USPTO Office Action for U.S. Appl. No. 10/194,358, Mar. 25, 2004 (7 pages).

USPTO Examiner Interview Summary for U.S. Appl. No. 10/194,358, Jun. 17, 2004 (3 pages).

USPTO Notice of Allowance and Fees Due for U.S. Appl. No. 10/194,358, Jan. 26, 2005 (4 pages).

USPTO Office Action for U.S. Appl. No. 10/193,971, Mar. 26, 2004 (8 pages).

USPTO Notice of Allowance and Fees Due for U.S. Appl. No. 10/193,971, Dec. 15, 2004 (4 pages).

USPTO Office Action for U.S. Appl. No. 10/194,018, Apr. 23, 2004 (7 pages).

USPTO Notice of Allowance and Fees Due for U.S. Appl. No. 10/194,018, Dec. 15, 2004 (4 pages).

USPTO Office Action for U.S. Appl. No. 10/193,817, Nov. 18, 2003 (5 pages).

USPTO Office Action for U.S. Appl. No. 10/193,817, Mar. 25, 2004 (11 pages).

USPTO Examiner Interview Summary for U.S. Appl. No. 10/193,817, May 24, 2004 (3 pages).

USPTO Examiner Interview Summary for U.S. Appl. No. 10/193,817, Oct. 18, 2004 (3 pages).

USPTO Office Action for U.S. Appl. No. 10/193,817, Oct. 18, 2004 (11 pages).

USPTO Office Action for U.S. Appl. No. 10/193,817, Jan. 10, 2005 (2 pages).

USPTO Office Action for U.S. Appl. No. 10/193,817, Apr. 7, 2005 (21 pages).

USPTO Examiner Interview Summary for U.S. Appl. No. 10/193,817, Aug. 1, 2005 (4 pages).

USPTO Notice of Allowance and Fees Due for U.S. Appl. No. 10/193,817, Oct. 31, 2005 (7 pages).

John Scarne—Scarne's Encyclopedia of Games—1973—Harper & Row—pp. 522-531.

Jojn Belton—Domino Games—1931—Raintree Editions—pp. 7-10.

U.S. Appl. No. 60/305,148, filed Jul. 13, 2001 (97 pages).

U.S. Appl. No. 60/305,146, filed Jul. 13, 2001 (62 pages).

U.S. Appl. No. 60/305,147, filed Jul. 13, 2001 (73 pages).

(56) References Cited

OTHER PUBLICATIONS

U.S. Appl. No. 60/305,149, filed Jul. 13, 2001 (83 pages).
U.S. Appl. No. 60/305,150, filed Jul. 13, 2001 (74 pages).
U.S. Appl. No. 60/305,151, filed Jul. 13, 2001 (89 pages).
U.S. Appl. No. 60/323,597, filed Sep. 20, 2001 (57 pages).
U.S. Appl. No. 60/323,598, filed Sep. 20, 2001 (60 pages).
USPTO Office Action for U.S. Appl. No. 10/193,980, Dec. 23, 2005 (9 pages).
USPTO Examiner Interview Summary for U.S. Appl. No. 10/193,980, Mar. 29, 2006 (4 pages).
USPTO Office Action for U.S. Appl. No. 10/193,980, Mar. 7, 2007 (12 pages).
USPTO Office Action for U.S. Appl. No. 10/193,980, Jun. 28, 2007 (3 pages).
USPTO Office Action for U.S. Appl. No. 10/193,980, Sep. 25, 2007 (5 pages).
USPTO Office Action for U.S. Appl. No. 10/193,980, Dec. 11, 2007, 15 pages.
USPTO Office Action for U.S. Appl. No. 10/193,980, Jun. 30, 2008 (13 pages).
USPTO Office Action for U.S. Appl. No. 10/193,980, Sep. 10, 2008 (3 pages).
USPTO Office Action for U.S. Appl. No. 11/335,253, Mar. 21, 2008 (10 pages).
USPTO Office Action for U.S. Appl. No. 11/335,253, Jun. 11, 2008 (3 pages).
USPTO Office Action for U.S. Appl. No. 11/334,848, May 16, 2008 (5 pages).
USPTO Office Action for U.S. Appl. No. 12/131,516, Jul. 8, 2009 (12 pages).
USPTO Examiner Interview Summary for U.S. Appl. No. 12/131,516, Nov. 9, 2009 (3 pages).
USPTO Office Action for U.S. Appl. No. 10/193,978, Mar. 31, 2004 (7 pages).
USPTO Office Action for U.S. Appl. No. 10/193,978, Dec. 14, 2004 (10 pages).
USPTO Office Action for U.S. Appl. No. 10/193,978, Jan. 25, 2005 (3 pages).
USPTO Notice of Allowance and Fees Due for U.S. Appl. No. 10/193,978, Nov. 30, 2005 (6 pages).
USPTO Office Action for U.S. Appl. No. 10/193,977, Apr. 21, 2004 (8 pages).
USPTO Notice of Allowance and Fees Due for U.S. Appl. No. 10/193,977, Dec. 20, 2004 (3 pages).
USPTO Office Action for U.S. Appl. No. 10/194,186, Apr. 30, 2004 (7 pages).
USPTO Notice of Allowance and Fees Due for U.S. Appl. No. 10/194,186, Dec. 15, 2004 (4 pages).
USPTO Office Action for U.S. Appl. No. 10/194,019, Mar. 26, 2004 (7 pages).
USPTO Office Action for U.S. Appl. No. 10/194,019, Dec. 14, 2004 (10 pages).
USPTO Notice of Allowance and Fees Due for U.S. Appl. No. 10/194,019, Jan. 31, 2005 (4 pages).
USPTO Examiner's Answer to Appeal Brief for U.S. Appl. No. 10/193,980, Sep. 23, 2009 (14 pages).
USPTO Examiner's Answer to Appeal Brief for U.S. Appl. No. 11/335,253, Feb. 24, 2009 (15 pages).
USPTO Office Action for U.S. Appl. No. 12/131,516, Jan. 13, 2010 (13 pages).
International Preliminary Examination Report for International Application No. PCT/EP2002/007806, Aug. 11, 2003 (9 pages).
International Preliminary Examination Report for International Application PCT/EP02/07807, Aug. 19, 2003 (5 pages).
USPTO Notice of Allowance and Fees Due for U.S. Appl. No. 12/131,516, Mar. 18, 2011 (15 pages).
USPTO Office Action for U.S. Appl. No. 11/397,596, Sep. 10, 2010 (11 pages).
Monopoly (TM) Parker Brothers Real Estate Trading Game (C) 1997, Retrieved from http://www.hasbro.com/common/instrucUmonins.pdf on Sep. 9, 2010 (6 pages).
USPTO Response to Reply Brief for U.S. Appl. No. 11/335,253, May 6, 2009 (3 pages).
USPTO Pre-Brief Appeal Conference Decision for U.S. Appl. No. 12/131,516, Jul. 22, 2010 (2 pages).
Case 2:16-cv-00856-RCJ-VCF, Document 1, "Plaintiffs' Complaint for Patent Infringement" filed Apr. 14, 2016 (39 pages).
Case 2:16-cv-00856-RCJ-VCF, Document 19, "Plaintiffs' First Amended Complaint for Patent Infringement", filed Jul. 11, 2016 (57 pages).
Case 2:16-cv-00856-RCJ-VCF, Document 23, "Defendant 888's Motion to Dismiss Plaintiffs First Amended Complaint Under Fed. R. Civ. P. 12(B)(6)", filed Aug. 12, 2016 (22 pages).
Case 2:16-cv-00856-RCJ-VCF, Document 26, "Defendant's Notice of Joinder to Motions to Dismiss in Related Cases", filed Aug. 12, 2016 (4 pages).
Case 2:16-cv-00856-RCJ-VCF, Document 37, "Index of Exhibits to Plaintiffs' Opposition to Defendant's Motion to Dismiss" filed Sep. 8, 2016 (3 pages).
Case 2:16-cv-00856-RCJ-VCF, Document 45, Defendant 888's Reply in Support to Dismiss Plaintiffs' First Amended Complaint Under Fed. R. Civ. P. 12(B)(6), filed Sep. 26, 2016 (19 pages).
Case 2:16-cv-00856-RCJ-VCF, Document 46, Defendant 888's Reply in Support of Motion to Dismiss Plaintiffs' First Amended Complaint Under Fed. R. Civ. P. 12(B)(6), filed Sep. 26, 2016 (19 pages).
Case 2:16-cv-00856-RCJ-VCF, Document 54, "Order", filed Dec. 6, 2016 (8 pages).
Case 2:16-cv-00856-RCJ-VCF, Document 57, "Defendant 888's Holdings PLC's Answer to Plaintiffs' First Amended Complaint", filed Jan. 18, 2017 (67 pages).
Case 2:16-cv-00857-APG-VCF, Document 1, "Plaintiffs' Complaint for Patent Infringement" filed Apr. 14, 2016 (29 pages).
Case 2:16-cv-00857-RCJ-VCF, Document 27, "Defendant Big Fish Games, Inc.'s Motion to Dismiss", filed Jun. 17, 2016 (30 pages).
Case 2:16-cv-00857-RCJ-VCF, Document 32, "[Corrected] Defendant Big Fish Games, Inc.'s Motion to Dismiss", filed Jul. 8, 2016 (30 pages).
Case 2:16-cv-00857-RCJ-VCF, Document 33, "Plaintiffs' Opposition to Big Fish Games, Inc.'s Motion to Dismiss", filed Jul. 25, 2016 (32 pages).
Case 2:16-cv-00857-RCJ-VCF, Document 34, "Reply in Support of Defendant Big Fish Games, Inc.'s Motion to Dismiss", filed Aug. 4, 2016 (17 pages).
Case 2:16-cv-00857-RCJ-VCF, Document 36, "Order" filed Aug. 29, 2016 (29 pages).
Case 2:16-cv-00857-RCJ-VCF, Document 37, "Plaintiffs' First Amended Complaint for Patent Infringement", filed Sep. 28, 2016 (38 pages).
Case 2:16-cv-00857-RCJ-VCF, Document 39, "Defendant Big Fish Games, Inc.'s Motion to Dismiss Plaintiffs' First Amended Complaint", filed Oct. 12, 2016 (17 pages).
Case 2:16-cv-00857-RCJ-VCF, Document 45, "Plaintiffs' Opposition to Big Fish Games, Inc.'s Motion to Dismiss", filed Oct. 31, 2016 (22 pages).
Case 2:16-cv-00857-RCJ-VCF, Document 49, "Reply in Support of Defendant Big Fish Games, Inc.'s Motion to Dismiss", filed Nov. 10, 2016 (16 pges).
Case 2:16-cv-00857-RCJ-VCF, Document 59, "Order", filed Jan. 4, 2017 (9 pages).
Case 2:16-cv-00857-RCJ-VCF, Document 60, "Defendant Big Fish Games, Inc.'s Answer to First Amended Complaint", filed Jan. 19, 2017 (17 pages).
Case 2:16-cv-00871-JAD-VCF, Document 1, "Plaintiffs' Complaint for Patent Infringement" filed Apr. 15, 2016 (39 pages).
Case 2:16-cv-00871-JAD-VCF, Document 23, "Plaintiffs' First Amended Complaint for Patent Infringement" filed Jul. 11, 2016 (57 pages).
Case 2:16-cv-00871-JAD-VCF, Document 31, "Motion to Dismiss Under 35 U.S.C. §101" filed Aug. 12, 2016 (16 pages).

(56) References Cited

OTHER PUBLICATIONS

Case 2:16-cv-00871-RCJ-VCF, Document 35, “Plaintiffs’ Opposition to Defendants’ Motion to Dismiss” filed Sep. 8, 2016 (25 pages).
Case 2:16-cv-00871-RCJ-VCF, Document 40, “Reply in Support of Motion to Dismiss Under 35 U.S.C. §101” filed Sep. 26, 2016 (14 pages).
Case 2:16-cv-00871-RCJ-VCF, Document 42, “Order” filed Oct. 18, 2016 (15 pages).
Case 2:16-cv-00871-RCJ-VCF, Document 46, “Motion for Reconsideration” filed Oct. 31, 2016 (7 pages).
Case 2:16-cv-00871-RCJ-VCF, Document 47, Motion to Dismiss Under Fed. R. Civ. P. 12(B)(6) filed Nov. 1, 2016 (7 pages).
Case 2:16-cv-00871-RCJ-VCF, Document 49, “Plaintiffs’ Opposition to Defendants’ Motion for Reconsideration”, filed Nov. 17, 2016 (11 pages).
Case 2:16-cv-00871-RCJ-VCF, Document 50, “Plaintiffs’ Opposition to Defendants’ Motion to Dismiss”, filed Nov. 17, 2016 (12 pages).
Case 2:16-cv-00871-RCJ-VCF, Document 55, Reply in Support of Defendants’ Motion to Dismiss Under Fed. R. Civ. P. 12(B)(6), filed Nov. 30, 2016 (6 pages).
Case 2:16-cv-00871-RCJ-VCF, Document 56, “Reply in Support of Motion for Reconsideration” filed Nov. 30, 2016 (7 pages).
Case 2:16-cv-00871-RCJ-VCF, Document 63, “Order” filed Jan. 4, 2017 (10 pages).
Case 2:16-cv-00871-RCJ-VCF, Document 64, “Bwin’s Answer to Plaintiffs’ First Amended Complaint” filed Jan. 6, 2017 (15 pages).
Case 2:16-cv-00858-MMD-GWF, Document 1, “Plaintiffs’ Complaint for Patent Infringement” filed Apr. 14, 2016 (30 pages).
Case 2:16-cv-00858-RCJ-VCF, Document 19, “Defendant Double Down Interactive LLC’s Motion to Dismiss”, filed Jun. 7, 2016 (32 pages).
Case 2:16-cv-00858-RCJ-VCF, Document 30, “Plaintiffs’ Opposition to Double Down’s Motion to Dismiss”, filed Jul. 8, 2016 (31 pages).
Case 2:16-cv-00858-RCJ-VCF, Document 51, “Reply in Support of Defendant Double Down Interactive LLC’s Motion to Dismiss”, filed Jul. 18, 2016 (14 pages).
Case 2:16-cv-00858-RCJ-VCF, Document 58, “Plaintiffs’ First Amended Complaint for Patent Infringement”, filed Sep. 28, 2016 (38 pages).
Case 2:16-cv-00858-RCJ-VCF, Document 63, “Defendant Double Down Interactive LLC’s Motion to Dismiss Plaintiffs’ First Amended Complaint for Patent Infringement”, filed Oct. 17, 2016 (31 pages).
Case 2:16-cv-00858-RCJ-VCF, Document 69, “Plaintiffs’ Opposition to Double Down Interactive, Inc.’s Motion to Dismiss”, filed Nov. 3, 2016 (24 pages).
Case 2:16-cv-00858-RCJ-VCF, Document 76, “Defendant Double Down Interactive LLC’s Reply in Support of Motion to Dismiss Plaintiffs’ First Amended Complaint for Patent Infringement”, filed Nov. 14, 2016 (18 pages).
Case 2:16-cv-00858-RCJ-VCF, Document 83, “Defendant Double Down Interactive LLC’s Answer, Defenses, and Counterclaims to Plaintiffs’ First Amended Complaint for Patent Infringement”, filed Jan. 18, 2017 (19 pages).
Case 2:16-cv-00858-RCJ-VCF, Document 84, “Plaintiffs’ Answer to Double Down Interactive LLC’s Counterclaims Against CG Technology Development, LLC”, filed Feb. 8, 2017 (4 pages).
Case 2:16-cv-00781-RFB-CWH, Document 1, “Plaintiffs’ Complaint for Patent Infringement” filed Apr. 7, 2016 (33 pages).
Case 2:16-cv-00781-MMD-CWH, Document 29, “Plaintiffs’ First Amended Complaint for Patent Infringement” filed Jun. 13, 2016 (42 pages).
Case 2:16-cv-00781-MMD-CWH, Document 37, “Defendant’s Motion to Dismiss Plaintiffs’ Amended Complaint Under Fed.R. Civ. P. 12(B)(6)” filed Jul. 29, 2016 (38 pages).
Case 2:16-cv-00781-MMD-CWH, Document 44, “Defendant’s Motion for Protective Order Staying Discovery Pending Ruling on Motion to Dismiss” filed Aug. 22, 2016 (12 pages).
Case 2:16-cv-00781-MMD-CWH, Document 45, “Plaintiffs’ Opposition to DraftKings, Inc.’s Motion to Dismiss” filed Aug. 24, 2016 (38 pages).
Case 2:16-cv-00781-MMD-CWH, Document 50, “Plaintiffs’ Opposition to DraftKings, Inc.’s Motion to Stay” filed Sep. 8, 2016 (12 pages).
Case 2:16-cv-00781-MMD-CWH, Document 57, “Defendant’s Reply in Support of it’s Motion to Dismiss Plaintiffs’ Amended Complaint Under Fed. R. Civ. P. 12(B)(6)” filed Sep. 26, 2016 (19 pages).
Case 2:16-cv-00781-MMD-CWH, Document 59, “Order” filed Sep. 27, 2016 (3 pages).
Case 2:16-cv-00781-RCJ-VCF, Document 64, “Plaintiffs” Motion to Lift Stay filed Nov. 23, 2016 (6 pages).
Case 2:16-cv-00781-RCJ-VCF, Document 69, “Order” filed Dec. 12, 2016 (11 pages).
Case 2:16-cv-00781-RCJ-VCF, Document 72, “DraftKings’ Answer to Plaintiffs’ First Amended Complaint and Affirmative Defenses” filed Dec. 27, 2016 (29 pages).
Case 2:16-cv-00801-JCM-VCF, Document 1, “Plaintiffs’ Complaint for Patent Infringement” filed Apr. 8, 2016 (31 pages).
Case 2:16-cv-00801-RCJ-VCF, Document 31, “Plaintiffs’ First Amended Complaint for Patent Infringement” filed Jun. 13, 2016 (48 pages).
Case 2:16-cv-00801-RCJ-VCF, Document 32, “Index of Exhibits to Plaintiffs’ First Amended Complaint for Patent Infringement” filed Jun. 13, 2016 (3 pages).
Case 2:16-cv-00801-RCJ-VCF Document 44, “Defendant Fanduel, Inc’s.Motion to Dismiss for Failure to State a Claim Upon Which Relief Can be Granted” filed Jul. 14, 2016 (18 pages).
Case 2:16-cv-00801-RCJ-VCF Document 75, “Defendant Fanduel, Inc’s Motion for Leave to Supplement Briefing Under LR 7-2(g)” filed Sep. 22, 2016 (3 pages).
Case 2:16-cv-00801-RCJ-VCF Document 77, “Plaintiffs’ Opposition to Defendant Fanduel, Inc.’s.Motion for Leave [ECF No. 75]” filed Oct. 11, 2016 (4 pages).
Case 2:16-cv-00801-RCJ-VCF Document 81, “Defendant Fanduel Inc.’s Notice of Withdrawal of Motion Seeking Leave to File Supplemental Briefing” filed Oct. 20, 2016 (3 pages).
Case 2:16-cv-00801-RCJ-VCF Document 86, “Plaintiffs’ Second Amended.Complaint for Patent Infringement” filed Nov. 16, 2016 (70 pages).
Case 2:16-cv-00801-RCJ-VCF Document 87, “Defendant Fanduel’s Answer to Plaintiffs’ Second Amended Complaint and Affirmative Defenses” filed Nov. 30, 2016 (19 pages).
Case 2:16-cv-00801-RCJ-VCF Document 88, “Defendant’s Partial Motion to Dismiss Cgt’s Second Amended Complaint for Failure to State a Claim Upon Which Relief Can Be.Granted” filed Nov. 30, 2016 (14 pages).
Case 2:16-cv-00801-RCJ-VCF Document 94, “Plaintiffs’ Opposition to Fanduel, Inc.’s Partial Motion to Dismiss” filed Dec. 19, 2016 (11 pages).
Case 2:16-cv-00801-RCJ-VCF Document 103, “Fanduel, Inc.’s Reply in Support of Partial Motion to Dismiss” filed Dec. 27, 2016 (7 pages).
Case 2:16-cv-00801-RCJ-VCF Document 113, “Order” filed Jan. 4, 2017 (11 pages).
Case 2: 16-cv-801-RCJ-VCF Document 114, “Transcript of Pretrial Conference” filed Dec. 2, 2016 (54 pages).
Tom Landry Strategy Football [online]. Home of the Underdogs [Retrieved from the Internet: <URL:http://squakenet.com/computer_games/6459/Tom-Landry-Strategy-Football/download.html>.

* cited by examiner

| RECORD ID (200) | GAME ID (202) | USER ID (204) | EVENT TYPE (206) | EVENT VALUE (208) | EVENT TIME (210) |
|---|---|---|---|---|---|
| 1 | BACKGAMMON | 1 | START OF GAME | 0-RED | 2002-06-19 15:33 |
| 2 | BACKGAMMON | 1 | DICE ROLL | 4,3 | 2002-06-19 15:34 |
| 3 | BACKGAMMON | 1 | MOVE | A1-D1 | 2002-06-19 15:36 |
| . . . | . . . | . . . | . . . | . . . | . . . |
| N | GOLF | 2 | SWING | 159 YARD SHOT ON THE GREEN | 2002-06-19 15:59 |

*FIG. 2*

152

| RECORD ID (250) | GAME ID (252) | USER ID (254) | STATISTIC TYPE (256) | STATISTIC VALUE (258) |
|---|---|---|---|---|
| 1 | BACKGAMMON 1 | 1 | AVERAGE TIME OF MOVE | 01:56 |
| 2 | BACKGAMMON 1 | 2 | NUMBER OF DOUBLES THROWN | 5 |
| 3 | BACKGAMMON 2 | 4 | NUMBER OF DOUBLES THROWN | 7 |
| . . . | . . . | . . . | . . . | . . . |
| N | GOLF 1 | 2 | BIRDIES MADE | 5 |

*FIG. 3*

154

*FIG. 4*

256

| CHESS | GOLF | BACKGAMMON |
|---|---|---|
| WINS | TOTAL DRIVING | AVERAGE TIME PER MOVE |
| LOSSES | LONGEST DRIVE | NUMBER OF DOUBLES THROWN |
| DRAWS | DRIVING DISTANCE | NUMBER OF BLOTS LEFT OPEN |
| POINTS | DRIVING ACCURACY PERCENTAGE | NUMBER OF PIECES ON BAR |
| AVERAGE TIME PER MOVE | BALL STRIKING | TIME OF PIECES ON BAR |
| FIRST MOVE TENDENCY | GREENS IN REGULATION PERCENTAGE | PERCENTAGE OF GAMES WHERE DOUBLING DIE IS USED |
| SKILL RATING | PUTTS PER ROUND | NUMBER OF TIMES THE DOUBLING DIE IS USED IN ONE GAME |
| WINNING STREAKS | PUTTING AVERAGE | NUMBER OF MOVES BEFORE THE FIRST DOUBLING DIE IS OFFERED |
| LOSING STREAKS | SAND SAVE PERCENTAGE | PIP COUNT DIFFERENCE BETWEEN PLAYERS WHEN DOUBLING DIE ACCEPTED/DECLINED |
| | TOTAL EAGLES | LOSING PLAYER'S PIP COUNT |
| | TOTAL BIRDIES | NUMBER OF TIMES EACH PLAYER IS UNABLE TO MOVE DURING A GAME |
| | SCORING AVERAGE | SIZE AND TIME HELD FOR A BLOCKADE |
| | RANKING | SIZE AND TIME HELD FOR A SPIKE |
| | | ABSOLUTE FREQUENCY OF DOUBLING DICE THROWN |
| | | RELATIVE FREQUENCY OF DOUBLING DICE THROWN AMONG PLAYERS |
| | | RELATIVE FREQUENCY OF SPECIFIC DOUBLING DICE THROWN |
| | | NET VALUE OF DICE THROWN |
| | | HITS PER GAME |
| | | PERCENTAGE OF BLOTS HIT |
| | | HITS/BLOTS RATIO |
| | | DOUBLING FREQUENCY |
| | | DOUBLING PASS FREQUENCY |
| | | DOUBLING TAKE FREQUENCY |
| | | AVERAGE TIME FOR A GAME |

156

| RECORD ID (270) | USER ID (272) | ACCOUNT INFORMATION (274) | STATISTICS INFORMATION (154) | WAGERING PARAMETERS (276) | USER CHARACTERISTICS (278) | SELECTION CRITERIA (280) |
|---|---|---|---|---|---|---|
| 1 | 100 | ...CREDIT LIMIT=$7,000<br>...BALANCE=$50,000<br>...CREDIT HISTORY=A<br>... | ...BACKGAMMON STATISTICS<br>...GOLF STATISTICS<br>... | ...WAGER LIMITS<br>...CURRENT WAGERS=5<br>... | ...DIAL-UP ACCESS<br>...RANKED 10/1105 IN BACKGAMMON<br>...CALIFORNIA BASED<br>... | ...WAGER>$100 ONLY<br>...NOVICE PLAYERS ONLY<br>... |
| 2 | 1100 | ...CREDIT LIMIT=$1,000<br>...BALANCE=$5,000<br>...CREDIT HISTORY=B | ...GOLF STATISTICS<br>...POKER STATISTICS<br>... | ...WAGER PREFERENCE= GOLF SIDE BETS<br>...WAGER FREQUENCY= HIGH<br>...HIGH RISK TOLERANCE | ...BROADBAND ACCESS<br>...RANKED 1402/2000 IN GOLF<br>...LONDON BASED<br>... | ...WAGER<$100 ONLY<br>...ALL SKILL LEVELS<br>...AGGRESSIVE PLAYERS ONLY<br>... |
| ⋮ | ⋮ | ⋮ | ⋮ | ⋮ | ⋮ | ⋮ |
| N | 3056 | ...CREDIT LIMIT=$500<br>...BALANCE=$1,000<br>...CREDIT HISTORY=B | ...CHESS STATISTICS<br>...BACKGAMMON STATISTICS<br>... | ...WAGER MAXIMUM =$1,000<br>...WAGER MINIMUM =$100<br>... | ...2 DISCONNECTS PER HOUR<br>...DIAL-UP ACCESS<br>...TEXAS BASED | ...WAGER>$100 AND<$1,000 ONLY<br>...EXPERT PLAYERS ONLY<br>...ALL STRATEGY LEVELS<br>... |

USER ATTRIBUTES (columns 276, 278)

*FIG. 5*

158

| 300 | 302 | 304 | 306 | 308 | 310 | 312 |
|---|---|---|---|---|---|---|
| RECORD ID | USER ID | USER ID | SERVER ID | WAGER EVENT | WAGER VALUE | WAGER CONDITIONS |
| 1 | 3 | 204 | 3 | BIRDIE BY USER 3 ON 12th HOLE | $100 | ROUND 1 PLAY ONLY |
| 2 | 501 | 342 | 4 | USER 501 WILL FINISH LAP IN LESS THAN 59 SECONDS | $240 | 3 ATTEMPTS ONLY |
| ⋮ | ⋮ | ⋮ | ⋮ | ⋮ | ⋮ | ⋮ |
| N | 3 | 204 | 3 | SAND SAVE BY USER 3 ON 12th HOLE | $50 | ROUND 1 PLAY ONLY |

WAGER PARAMETERS

*FIG. 6*

SYSTEM FOR ESTABLISHING A WAGER FOR A GAME

CROSS REFERENCE TO RELATED APPLICATION

This application is a continuation of U.S. patent application Ser. No. 10/193,980 filed Jul. 12, 2002, claiming the benefit of U.S. Provisional Application No. 60/305,149 filed Jul. 13, 2001; U.S. Provisional Application No. 60/323,597 filed Sep. 20, 2001; U.S. Provisional Application No. 60/305,151 filed Jul. 13, 2001; U.S. Provisional Application No. 60/305,150 filed Jul. 13, 2001; U.S. Provisional Application No. 60/305,147 filed Jul. 13, 2001; U.S. Provisional Application No. 60/305,146 filed Jul. 13, 2001; and U.S. Provisional Application No. 60/323,598 filed Sep. 20, 2001.

TECHNICAL FIELD OF THE INVENTION

This invention relates to online gaming and, more specifically, to a system for establishing a wager for a game.

BACKGROUND OF THE INVENTION

The Internet and the increasing availability of broadband services have led to the proliferation of online gaming. Currently, however, online gaming suffers from many drawbacks. Primary among these is that current online gaming fails to allow players to compete for tangible prizes in a secure environment that does not rely upon trust among the competitors. Moreover, the online gaming experience does not provide incentive for a player to become a dedicated patron of any particular gaming environment. As a result, online gaming remains a mere hobby for most players.

SUMMARY OF THE INVENTION

In a particular embodiment of the present invention, a system for establishing a wager associated with a game comprises one or more web servers that provide access to an online game for a plurality of users. The system further comprises one or more processors that receive information about a wager offer, wherein the wager offer is associated with the online game. The one or more processors also receive information about a wager acceptance. The wager offer and the wager acceptance combine to form a wager, wherein the wager is associated with at least one wager parameter. The system further comprises a memory communicatively coupled to the one or more processors and that stores information associated with the at least one wager parameter.

In another embodiment of the present invention, a system for establishing a wager associated with a game comprises one or more web servers that provide access to an online game for a plurality of users. The online game is associated with a wager offer and a wager acceptance. The wager offer and the wager acceptance combine to form a wager.

A particular advantage of one or more embodiments of the present invention is that a processor may receive information about a wager associated with an online game and present that information to a memory that stores the information. Particular embodiments may thus allow a processor to process and a memory to store information about a wager between two players of an online game, facilitating wagering associated with online play.

Another technical advantage of particular embodiments of the present invention is that a processor may process and a memory may store information about a wager associated with any number of types of online games. As an example only, in particular embodiments, a processor may process and a memory may store information about a wager associated with an online golfing game, an online casino game, an online adventure game, an online arcade games, an online sports games, or an online racing game. The processor and memory may thus facilitate wagering associated with online play of a number of different types of online games.

Another technical advantage of particular embodiments of the present invention is that a processor and memory that facilitate wagering associated with an online game may allow multiple users in different locations to wager over a network. Thus, particular embodiments may comprise a processor and memory that facilitate wagering over all or a part of the Internet or over a wireless network. These embodiments may allow users in different locations on a network to make a wager associated with an online game.

It will be understood that the various embodiments of the present invention may include some, all, or none of the enumerated technical advantages. In addition, other technical advantages of the present invention may be readily apparent to one skilled in the art from the figures, description, and claims included herein.

BRIEF DESCRIPTION OF THE DRAWINGS

For a more complete understanding of the present invention and its advantages, reference is now made to the following description, taken in conjunction with the accompanying drawings, in which:

FIG. 2 illustrates one embodiment of event information maintained by the system of FIG. 1;

FIG. 3 illustrates one embodiment of statistics information maintained by the system of FIG. 1;

FIG. 4 illustrates exemplary statistics maintained by the system of FIG. 1;

FIG. 5 illustrates one embodiment of profile information maintained by the system of FIG. 1;

FIG. 6 illustrates one embodiment of a wager record maintained by the system of FIG. 1;

DETAILED DESCRIPTION OF EXAMPLE EMBODIMENTS OF THE INVENTION

Figure 1:
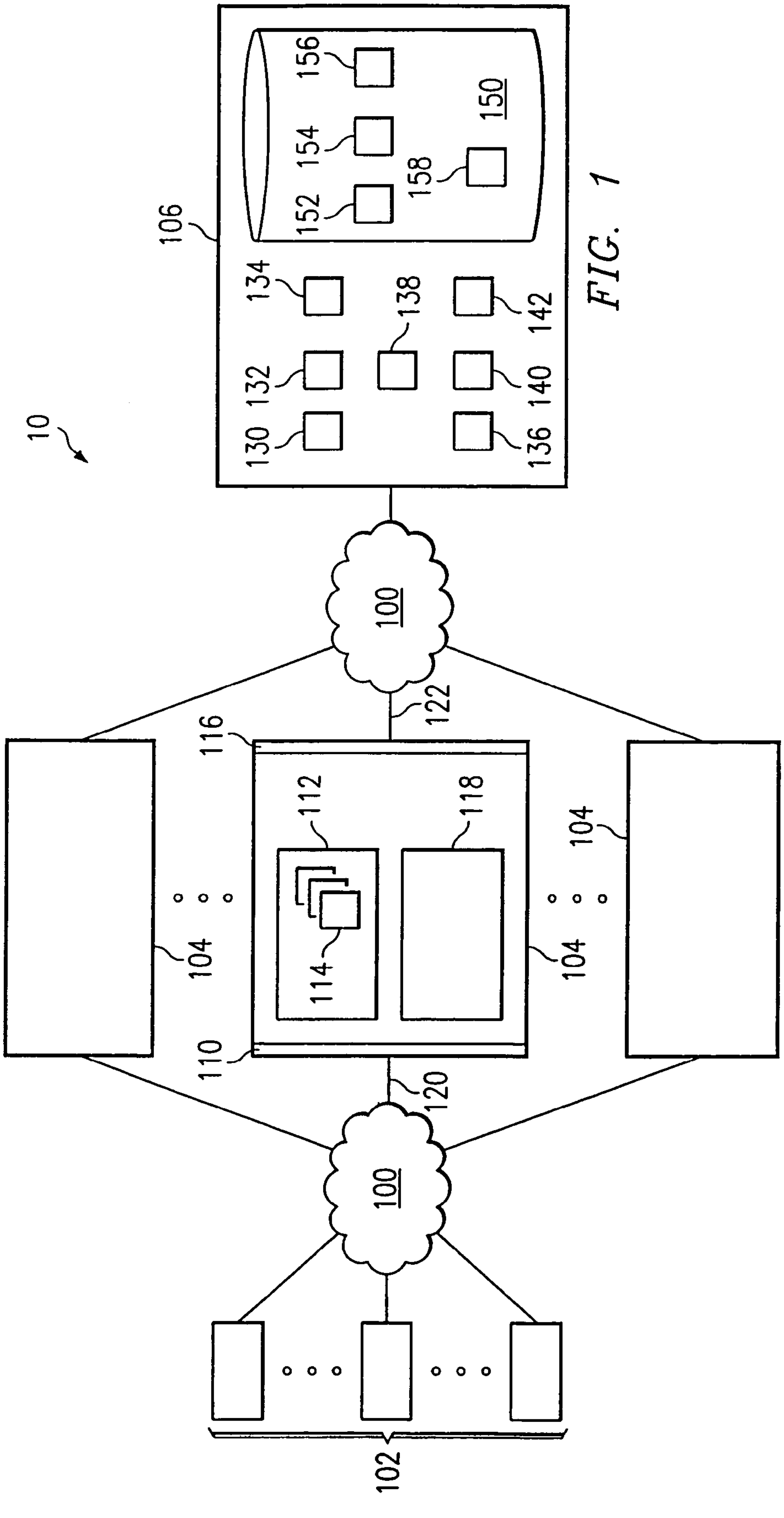
FIG. 1 illustrates one embodiment of a system for providing enhanced services to a user of a gaming application according to the present invention.

FIG. 1 illustrates a system 10 for executing gaming applications 114 in accordance with one embodiment of the present invention. System 10 includes network 100, one or more clients 102, one or more servers 104, and a platform 106. Other architectures and components of system 10 may be used without departing from the scope of this disclosure. In general, clients 102 participate in gaming applications 114 hosted by servers 104. Platform 106 provides enhanced services associated with gaming applications 114 such as, for example, game event management, statistics generation, user profiling, wagering, user matching, and game advising. Platform 106 may provide other enhanced services without departing from the scope of this disclosure.

Network 100 couples clients 102, servers 104, and/or platform 106. Network 100 facilitates wireless or wireline communication between the components of system 10. Network 100 may, for example, communicate Internet Protocol (IP) packets, Frame Relay frames, Asynchronous Transfer Mode (ATM) cells, voice, video, data, and other suitable information between network addresses. Network 100 may include one or more local area networks (LANs), radio access networks (RANs), metropolitan area networks (MANs), wide area networks (WANs), interactive television networks, all or a portion of the global computer network known as the Internet, and/or any other communication system or systems at one or more locations.

Clients 102 comprise computer systems that include appropriate input devices, output devices, mass storage media, processors, memory, or other components for receiving, processing, storing, and/or communicating information with other components of system 10. As used in this document, the term "computer" is intended to encompass a personal computer, workstation, network computer, wireless data port, wireless telephone, personal digital assistant (PDA), one or more processors within these or other devices, or any other suitable processing device. It will be understood that there may be any number of clients 102 coupled to network 100. Clients 102 are generally operated by users to participate in gaming applications 114 hosted by server 104, either as players or spectators.

Server 104 comprises an electronic computing device that includes a monitor module 110, a gaming processor 112 that executes one or more gaming applications 114, and an interface 116 to communicate with platform 106. In a particular embodiment, server 104 further includes a lobby processor 118 that facilitates matching players of a particular gaming application 114. It should be understood that lobby processor 118 and gaming processor 112 may reside on the same or different server 104. Server 104 may be implemented using a general purpose personal computer (PC), a Macintosh, a workstation, a UNIX-based computer, a server computer, or any other suitable processing device. In general, each server 104 hosts the same or different gaming applications 114 for clients 102 over network 100, monitors game events 120 generated by clients 102 using a monitor module 110, and communicates event information 122 to platform 106 using interface 116.

In one embodiment, server 104 comprises a web server (or a pool of servers). One function of web server 104 is to allow a client 102 to participate in gaming applications 114 over or from the Internet using a standard user interface language such as, for example, the HyperText Markup Language (HTML). For example, server 104 and clients 102 may maintain and execute a browser or other suitable program for accessing and communicating information addressed by a uniform resource locator (URL) using network 100.

A gaming application 114 comprises any suitable game that may be played by one or more users of system 10. Examples of gaming applications 114 include sports games, board games, arcade games, strategy games, adventure games, casino games, card games, dice games, and any other suitable games that may be played using system 10.

Platform 106 comprises a central processing unit (CPU) associated with an operating system that executes instructions and manipulates information in accordance with the operation of system 10. The CPU of platform 106 maintains and executes the instructions to implement an event manager 130, a statistics manager 132, a profile manager 134, a lobby manager 136, a game advisor 138, a wager manager 140, and a funds manager 142. Although the various components of platform 106 are illustrated as separate modules, it should be understood that any suitable number and combination of engines or modules may be used to perform the various features and functionality of platform 106. Each module described above with reference to platform 106 comprises any suitable combination of hardware and software in platform 106 to provide the described function or operation of the module. For example, modules may include program instructions, and the associated memory and processing components to execute the program instructions. Also, modules associated with platform 106 may be separate from or integral to other modules.

Platform 106 further comprises a memory 150 that may take the form of volatile or non-volatile memory including, without limitation, magnetic media, optical media, random access memory (RAM), read-only memory (ROM), removable media, or any other suitable local or remote memory component. Memory 150 may be separate from or integral to other memory devices in system 10. In general, memory 150 stores event information 152, statistics information 154, profile information 156, and wager records 158 in any suitable format including, for example, XML tables, flat files, comma-separated-value (CSV) files, SQL tables, relational database tables, objects, and others.

Enhanced Services

In one aspect of operation, users of clients 102 participating in gaming applications 114 hosted by a server 104 engage in an enhanced services session with platform 106. Generally, platform 106 receives a request for enhanced services that is generated by a client 102 via an appropriate server 104. The request for enhanced services may be generated by the client 102 in response to a log-in event; a game event 120; input by a user of the client 102 such as, for example, instructions to initiate an enhanced services session; or any other suitable trigger.

In response to the request for enhanced services, platform 106 launches an enhanced services session with the particular client 102. In particular, platform 106 establishes one or more communication paths to the appropriate clients 102 and/or servers 104. In one embodiment, platform 106 establishes a communication path with the appropriate client 102 via an appropriate server 104. In another embodiment, platform 106 establishes a communication path with the appropriate client 102 using a proprietary web server (not shown). In yet another embodiment, platform 106 establishes a direct communication path with the appropriate client 102 using network 100. In all of these embodiments, the appropriate communication path is established such that platform 106 may provide enhanced services to the appropriate client 102.

The enhanced services session corresponds in time at least in part with the execution of the gaming application 114 in which the user of client 102 participates. During the enhanced services session, platform 106 may provide event management, statistics generation, and user profiling services to the user of client 102 with whom the enhanced services session is established. Other exemplary enhanced services include providing game advice, placing and settling wagers, and matching users of a gaming application 114 in an "intelligent lobby". In this regard, platform 106 enriches the gaming experience of users participating in gaming applications 114 hosted by servers 104.

A particular advantage of system 10 is that platform 106 may simultaneously conduct enhanced services sessions with many clients 102 using the same or different servers 104. For example, platform 106 may conduct a first enhanced services session with one or more clients 102 connected to a first server 104 hosting a gaming application 114. Platform 106 may further conduct a second enhanced services session with the same or different clients 102 connected to a second server 104 hosting the same or different gaming application 114. The second enhanced services session may be initiated in response to a second request for enhanced services issued by the client 102 of the second server 104, and may correspond in time at least in part with the execution of the gaming application 114 in which the user participates. Moreover, the first enhanced services session may correspond in time at least in part with the second enhanced services session. In this regard, platform 106 may provide enhanced services to clients 102 coupled to many servers 104 simultaneously.

Game Event Management

During an enhanced services session, platform 106 may provide different types of enhanced services to users of a client 102, such as game event management. While participating in a gaming application 114, a client 102 generally initiates many game events 120. A game event 120 comprises any combination of steps, moves, actions, such as an action undertaken by a user, or any other suitable events that occur within the context of a particular gaming application 114 that causes a change in the state of the gaming application 114. For example, in a golf gaming application 114, a game event 120 may comprise the selection of a golf club, the alignment of a golf shot, the execution of a golf shot, or any other golf-related activity performed by the user of the golf gaming application 114.

To provide game event management services to the appropriate client 102 during an enhanced services session, monitor module 110 of server 104 monitors the various game events 120 that are performed by a client 102 participating in a gaming application 114. Upon the performance of a game event 120, as determined by monitor module 110, interface 116 communicates corresponding event information 122 to platform 106. Event information 122 comprises data detailing the parameters of the corresponding game event 120. Event information 122 includes data detailing any number and combination of game events 120. Event information 122 may further comprise end-of-game data associated with a user of a gaming application 114, a gaming application 114, or both.

Event manager 130 of platform 106 processes event information 122 to generate event information 152. Event information 152 may comprise some or all of the data associated with event information 122 and generally comprises a log that may be used to reconstruct the sequence of game events 120 that occurred during the execution of a particular gaming application 114. In a particular embodiment, server 104 processes event information 122 to generate event information 152 prior to communicating it to platform 106. In this regard, server 104 filters event information 122. Event information 152 may be stored in memory 150 and is described in greater detail with respect to FIG. 2.

As described above, platform 106 may conduct enhanced services sessions with many clients 102 using the same or different servers 104. With respect to game event management, therefore, event manager 130 may receive first event information 122 from a first server 104 monitoring the game events 120 of a first set of clients 102, and event manager 130 may further receive event information 122 from any number of other servers 104. For example, event manager 130 may receive second event information 122 from a second server 104 monitoring the game events 120 of a second set of clients 102. The first event information 122 details the parameters of game events 120 associated with the first set of clients 102 coupled to the first server 104 whereas the second event information 122 details the parameters of game events 120 associated with the second set of clients 102 coupled to the second server 104. Memory 150 stores first event information 152 as well as second event information 152.

In general, the first and second servers 104 may execute the same or different gaming applications 114 substantially simultaneously and, therefore, may communicate first and second event information 122 to platform 106 substantially simultaneously as well. In this regard, platform 106 may provide event management services to clients 102 participating in gaming applications 114 hosted by many different servers 104.

A particular advantage of system 10 is that game events 120 are monitored, and may even be processed, during the execution of the gaming application 114. Therefore, event information 152 comprises intra-game information and data. Such intra-game data generally provides meaningful insight into the execution of a gaming application 114 by a user. Moreover, such intra-game data may be used to generate statistics or compile user profiles, as described in greater detail below. As a result, platform 106 is able to provide real-time enhanced services to clients 102 using real-time data.

Statistics Generation

During an enhanced services session, platform 106 may provide another type of enhanced service to users of a client 102, such as statistics generation. In general, statistics manager 132 generates statistics information 154 based at least in part upon event information 152 (or 122). In a particular embodiment, statistics manager 132 generates statistics information 154 based upon previously generated statistics information 154. Statistics information 154 comprises data that is collected, sorted, organized, analyzed, or otherwise processed to define one or more quantitative and/or qualitative characteristics about a gaming application 114, a user of a gaming application 114, or both. Statistics information 154 may be stored in memory 150 and is described in greater detail with respect to FIGS. 3 and 4.

Statistics information 154 may be generated for particular users of clients 102 and for particular gaming applications 114. For example, statistics information 154 may be generated for different players of a backgammon gaming application 114. In this example, as each of the players triggers a game event 120 during the execution of the gaming application 114, statistics manager 132 generates statistics information 154 based at least in part upon the resulting event information 152. Statistics manager 132 may also generate statistics information 154 based upon end-of-game data communicated by server 104 about a gaming application 114.

In this regard, statistics information 154 is based not only upon data that is collected and/or determined after a gaming application 114 is completed, but statistics information 154 is also based upon real-time data generated from within the gaming application 114. Therefore, statistics information 154 reveals not only characteristics associated with the outcome of a gaming application 114, but also characteristics associated with how particular players play a gaming application 114. A particular advantage of this sort of real-time statistics generation is that platform 106 may then present statistics information 154 to users of clients 102 during the execution of a gaming application 114. The users of clients 102 may then use statistics information 154 to determine strengths and weaknesses of an opponent or the user; to modify a playing strategy; or to offer or accept a wager. All of this can be performed during and/or after the execution of a gaming application 114.

Another advantage of statistics manager 132 is that it may compare first statistics information 154, such as statistics information 154 associated with a particular user, with second statistics information 154, such as statistics information 154 associated with the same or different user. Platform 106 may then provide any number and combination of enhanced services to any number and combination of users based upon this comparison of statistics information 154. For example, platform 106 may audit the execution of a gaming application 114 by a particular user by comparing any combination of event information 152, statistics information 154, and profile information 156 associated with the user. Platform 106 may further measure any combination of event information 152, statistics information 154, and profile information 156 against certain predetermined thresholds associated with the user. In this regard, platform 106 may determine whether the user is playing a particular gaming application 114 at an expected skill level. Such an audit of player performance may reveal cheating or other anti-competitive behavior.

As described above, platform 106 may conduct enhanced services sessions with many clients 102 using the same or different servers 104. With respect to statistics generation, in one embodiment, statistics manager 132 may generate statistics information 154 based upon event information 122 received from a first server 104 monitoring the game events 120 of a first set of clients 102 participating in one or more gaming applications 114, and further based upon event information 122 received from the same server 104 or any number of other servers 104 monitoring the game events 120 of any number of the same or different clients 102 participating in the same or different gaming applications 114.

In this regard, the statistics information 154 generated by statistics manager 132 is robust and based upon a large sampling of data. Moreover, this technique allows statistics manager 132 to provide statistics generation services to clients 102 participating in gaming applications 114 hosted by many different servers 104. In other embodiments, the statistics information 154 may be based solely upon event information 152 (or 122) received from a particular server 104. This allows statistics manager 132 to generate statistics information 154 that is focused upon a particular user or gaming application 114.

User Profiling

During an enhanced services session, platform 106 may provide yet another type of enhanced service to users of clients 102, such as user profiling. In general, profile manager 134 generates profile information 156 for users of clients 102. Profile information 156 comprises a summary or analysis of any suitable qualitative and/or quantitative data that represents various features or characteristics about each particular user, such as, for example, financial data, statistical data, and user attributes. Profile manager 134 may generate profile information 156 based upon one or more of information and data entered by particular users; event information 152 (or 122); statistics information 154; and wager records 158. Profile information 156 may be stored in memory 150 and is described in greater detail with respect to FIG. 5. For example, system 10 can determine how aggressive a user is with the doubling dice in a backgammon gaming application 114; how often a user drives on the shoulder in a car racing gaming application 114; or which golf club a user prefers on a particular hole of a golf gaming application 114.

As described above, platform 106 may conduct enhanced services sessions with many clients 102 using the same or different servers 104. With respect to user profiling, profile manager 134 may generate profile information 156 based upon information and data received from clients 102 coupled to one or more different servers 104 at the same or different times. For example, profile manager 134 may generate profile information 156 based upon event information 122 (or 152) that is received from any number and combination of servers 104. In another example, profile manager 134 may generate profile information 156 based upon statistics information 154 compiled from event information 122 (or 152) that is received from any number and combination of servers 104.

Profile manager 134 may generate and/or update profile information 156 for particular users over time. For example, profile manager 134 may start generating profile information 156 for a particular user when a user first registers with system 10 and, thereafter, may update profile information 156 for that particular user each time the user participates in system 10—either as a player, a spectator, or a wagerer—using the same or different servers 104. Therefore, a user may play a backgammon gaming application 114 using a first server 104 and, at a later time, watch a chess gaming application 114 using a second server 104 and, at a still later time, wager on a golf gaming application 114 using a third server 104. Profile manager 132 may update profile information 156 for the user to include various characteristics about the user participating in each of these activities. With respect to playing a gaming application 114, for example, the profile information 156 may reflect how the user plays. With respect to watching a gaming application 114, for example, the profile information 156 may reflect what the user watches. With respect to wagering on a gaming application 114, for example, the profile information 156 may reflect how much the user prefers to wager.

Platform 106 uses profile information 156 to provide a host of other enhanced services, described in greater detail below. For example, lobby manager 136 may use profile information 156 to rank and/or match players of a particular gaming application 114. Game advisor 138 may use profile information 156 to provide advice to a player on how to play a particular gaming application 114. Wager manager 140 may use profile information 156 to provide a user of a client 102 with an opportunity to offer or accept a wager regarding a gaming application 114.

Matching Users in an "Intelligent Lobby"

During an enhanced services session, platform 106 may provide yet another type of enhanced service to users of a client 102, such as matching users of a gaming application 114 in an "intelligent lobby". Generally, a "lobby" is an online environment where players of gaming applications 114 meet one another and decide to play a gaming application 114 against each other. Lobby manager 136 creates an "intelligent lobby" in which players of gaming applications 114 are sorted, filtered, and presented to other players using profile information 156. Lobby processor 118 generally supports these efforts to match players of a gaming application 114. In a particular embodiment, lobby manager 136 matches players of gaming applications 114 against each other based at least in part upon profile information 156. In another embodiment, lobby manager 136 creates tournaments for gaming applications 114 by ranking players and arranging multiple rounds of competition using profile information 156. In this regard, lobby manager 136 creates a positive player experience by helping players find the right opponents.

Game Advice

During an enhanced services session, platform 106 may provide still another type of enhanced service to users of a client 102, such as providing game advice associated with a gaming application 114. Game advisor 138 presents game advice to players of a gaming application 114 during the execution of the gaming application 114 based upon various types of information about a player, an opponent, a wager, a gaming application 114, or any combination thereof. For example, game advisor 138 may provide game advice based upon any combination of event information 152 (or 122), statistics information 154, and profile information 156 of any suitable user of system 10. In a particular embodiment where a user may have a wager in place, game advisor 138 may provide game advice based upon the parameters of various wager records 158.

The game advice provided to a user generally comprises various options, strategies, suggestions, or any other suitable information that may be used to invoke a subsequent game event 120. In a particular embodiment, game advisor 138 may provide advice on whether to place and/or accept a wager, the parameters of the wager, and other wager-related information. A particular advantage of game advisor 138 is that the game advice is provided to the players during the execution of the gaming application 114 using real-time data.

As described above, platform 106 may conduct enhanced services sessions with many clients 102 using the same or different servers 104. With respect to game advice services, game advisor 138 may provide game advice to players of a gaming application 114 hosted by a first server 104 using information collected from the first server 104 or from a second server 104. For example, a player of a first chess game hosted by a first server 104 may receive game advice that is based upon game events 120 initiated by the same or different opponent playing a second chess game hosted by the first server 104 or the second server 104. The opponent may be currently playing or have previously played the second chess game. In this regard, game advisor 138 accesses a wider range of data to provide more robust game advice to players.

Moreover, game advisor 138 may provide first game advice to players of a first gaming application 114 and second game advice to players of a second gaming application 114. The first and second gaming applications 114 may be the same or different online games hosted by the same or different server 104. In this regard, game advisor 138 may provide different game advice to many different players of gaming applications 114 in system 10 at the same time.

Placing and Settling Wagers

During an enhanced services session, platform 106 may provide another type of enhanced service to users of a client 102, such as placing and settling wagers. Wager manager 140 facilitates placing and settling wagers among users of system 10. With respect to placing wagers, in one embodiment, wager manager 140 presents an appropriate graphical user interface, such as a "wager window" to a user during the execution of a gaming application 114. The wager window may be presented in response to a game event 120, event information 152, a request issued by a user, or any other suitable trigger. The wager window may be used to generate a wager offer.

The wager offer generally includes the parameters of the wager, such as the amount of the wager, the subject matter of the wager, a target of the wager offer, and the like. Wager manager 140 presents the wager offer to particular targets as specified in the wager offer, as specified by profile information 156, or according to any other suitable criteria. If one or more targets accept the wager offer, then wager manager 140 creates a corresponding number of wager records 158. Each wager record 158 defines the terms and conditions of the wager in various wager parameters, including the wager event, the wager value, and various wager conditions, and is stored by memory 150. The wager event is the subject matter of the wager, and generally involves a game event 120 associated with a gaming application 114. For example, the wager event may comprise an action performed during the execution of a gaming application 114 that changes the state of the gaming application 114. The outcome of a particular wager may be determined, at least in part, based upon the occurrence or non-occurrence of an associated wager event.

A particular advantage of wager manager 140 is that it allows a user to generate a wager offer before, during, or after the execution of a gaming application 114. This allows players to make a side bet, for example, during game play. By providing the GUI to the user without requiring the user to navigate to another web-site or to log-on with a separate server dedicated to establishing wagers, the ability to generate a wager offer is integrated into the gaming experience.

As described above, platform 106 may conduct enhanced services sessions with many clients 102 using the same or different servers 104. With respect to wagering services, wager manager 140 may facilitate wagers between clients 102 coupled to the same or different servers 104 and participating in the same or different gaming applications 114. For example, wager manager 140 may receive a wager offer from a user of client 102 coupled to a first server 104 for presentation to users of clients 102 coupled to the same first server 104 or to clients 102 coupled to any number of other servers 104. Moreover, wager manager 140 may receive an acceptance to the wager offer from users of clients 102 coupled to the same or different servers 104 and participating in the same or different gaming applications 114. In this regard, wager manager 140 provides a wider wagering audience for users of system 10.

With respect to settling wagers, in one embodiment, wager manager 140 determines the outcome of a wager based at least in part upon event information 152 (or 122) and the wager parameters specified in the corresponding wager record 158. For example, wager manager 140 may determine the outcome of a wager based upon event information 152 and a wager event specified in a wager record 158. The event information 152 (or 122) used by wager manager 140 is communicated by an appropriate server 104 and provides details about game events 120 that are relevant to the outcome of the wager. As a result of the real-time event monitoring capabilities of platform 106, wager manager 140 can determine the outcome of a wager in real-time and allows a user to formulate a wager based upon intra-game events 120. In particular embodiments, wager manager 140 in combination with funds manager 142 operates to transfer funds between accounts of participants of a wager based upon the determined outcome of the wager. This type of wager settlement may occur at any appropriate time after the outcome of the wager is determined.

FIG. 2 illustrates the contents of event information 152 stored in a table of memory 150. Event information 152 comprises data detailing the parameters of a corresponding game event 120. Event information 152 may comprise some or all of the event information 122 communicated by a corresponding server 104. Each entry of the table includes a record identifier 200, a game identifier 202, a user identifier 204, an event type 206, an event value 208, and an event time 210. Record identifier 200 comprises information identifying each unique record of event information 152. A particular record identifier 200 may correspond to a particular game event 120. Game identifier 202 comprises information identifying the gaming application 114 associated with a particular record of event information 152. User identifier 204 comprises information identifying a particular user of a client 102 associated with a particular record of event information 152. Event type 206 identifies the type of game event 120 associated with a particular record of event information 152. Event value 208 comprises information quantifying the game event 120 associated with a particular record of event information 152. Event time 210 comprises information describing the time at which the particular game event 120 occurs.

FIG. 3 illustrates the contents of statistics information 154 stored in a table of memory 150. Each entry of the table includes a record identifier 250, a game identifier 252, a user identifier 254, a statistic type 256, and a statistic value 258. Record identifier 250 comprises information identifying a particular record of statistics information 154. Particular statistics information 154 may be associated with particular types of gaming applications 114. Therefore, game identifier 252 comprises information identifying a particular gaming application 114 with which a particular record of statistics information 154 is associated. Statistics information 154 may be maintained according to particular users playing particular gaming applications 114. Therefore, user identifier 254 comprises information identifying a particular user of a client 102 associated with the particular record of statistics information 154. Statistics manager 132 may maintain statistics information 154 of varying statistic types 256 according to the type of gaming application 114. Therefore, statistic type 256 comprises the type of statistic that is maintained in a particular record of statistics information 154. Statistic value 258 comprises information quantifying the statistics information 154 of a particular statistic type 256 for each record.

FIG. 4 illustrates various statistic types 256 according to the various gaming applications 114. Although FIG. 4 illustrates statistic types 256 for chess, golf, and backgammon, it should be understood that statistics manager 132 may maintain any combination of statistic types 256 for any number of gaming applications 114. All of these statistics can be maintained for an individual game or as an average across several games over time.

FIG. 5 illustrates the contents of profile information 156 stored in a table of memory 150. Each entry of profile information 156 includes a record identifier 270, a user identifier 272, account information 274, statistics information 154, and user attributes such as, for example, wagering parameters 276 and user characteristics 278. In some embodiments, profile information 156 further includes selection criteria 280. In other embodiments, a user provides selection criteria 280 upon entering the "intelligent lobby". In still further embodiments, profile information 156 includes previously provided selection criteria 280 and a user may provide additional or new selection criteria 280 upon entering the "intelligent lobby".

Record identifier 270 comprises information used to identify a particular user profile of profile information 156. User identifier 272 comprises information used to identify the particular user of client 102 for whom a specific user profile of profile information 156 is maintained. In general, profile manager 134 maintains a user profile for each user of system 10. For each user profile, account information 274 comprises financial information such as, for example, credit limits, balance, credit history, and any other suitable financial information associated with a particular user. Statistics information 154 is illustrated in greater detail with respect to FIG. 3. Profile information 156 arranges statistics information 154 according to particular users in the corresponding user profiles.

Wagering parameters 276 comprise information identifying wager limits, current wagers, wager preferences, wager frequency, wager minimums and maximums, risk tolerance, and any other suitable wagering parameters associated with a particular user. User characteristics 278 comprise information identifying the playing style of a particular user. For example, user characteristics 278 may include the number of disconnects a particular user performs during the execution of a gaming application 114; the connection speed of a particular client 102 (e.g. broadband, or dial-up access); the average response time to perform a game event 120; evaluations of a particular user by other users of system 10; a ranking of the user among peer players for a particular gaming application 114; the geography of the particular user; and any other suitable characteristics about a particular user.

Selection criteria 280 comprises any suitable criteria used to select prospective opponents for a particular gaming application 114 such as, for example, wager criteria (e.g. wager size, wager type, wager frequency); skill criteria (e.g. skill level, ranking, skill weakness/strengths); player strategy (e.g. aggressive, conservative); and any other suitable selection criteria.

FIG. 6 illustrates the contents of wager records 158 stored in a table of memory 150. Each wager record 158 includes a record identifier 300, a first user identifier 302, a second user identifier 304, a server identifier 306, and wager parameters such as a wager event 308, a wager value 310, and wager conditions 312. Record identifier 300 comprises information used to identify a particular wager record 158. User identifier 302 comprises information used to identify a first participant of the wager and user identifier 304 comprises information used to identify the second participant of a particular wager. Server identifier 306 comprises information used to identify the servers 104 associated with a particular wager. For example, platform 106 may receive event information 122 from various servers 104 that may be used to determine the outcome of a particular wager. These servers 104 are identified using server identifiers 306.

Wager parameters 308, 310, and 312 define the terms and conditions of the wager record 158. For example, wager event 308 comprises information used to identify a particular event, such as a game event 120, that determines the outcome of the wager. Wager value 310 comprises information used to identify the value of the particular wager record 158. Wager conditions 312 comprise information used to identify any other parameters associated with the wager. For example, wager conditions 312 may comprise time limits for the particular wager, various rules to be applied to the wager, and any other suitable wager parameter.

Figure 7:
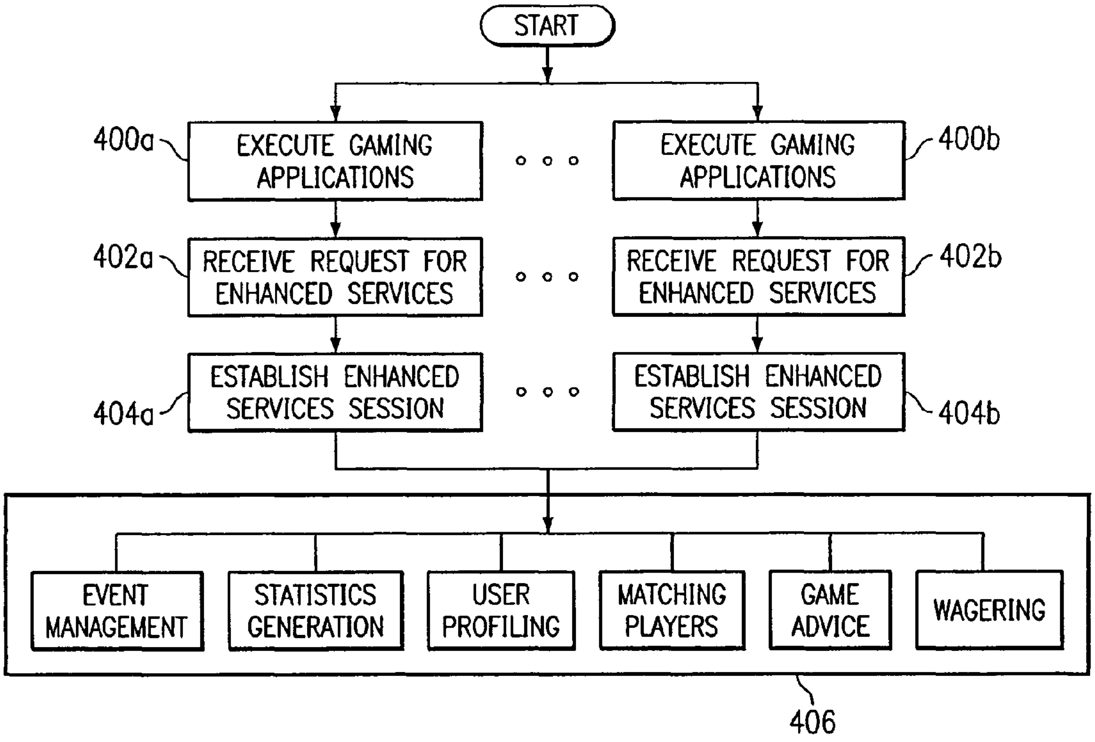
FIG. 7 illustrates one embodiment of a method for providing enhanced services.

FIG. 7 illustrates a flowchart of an exemplary method for providing enhanced services. The method begins at step 400 where server 104 executes one or more gaming applications 114. At step 402, server 104 and/or platform 106 receives a request for enhanced services. At step 404, platform 106 establishes an enhanced services session with the user of the gaming application 114 in response to the request for enhanced services received at step 402. In general, the enhanced services session corresponds in time at least in part with the execution of a gaming application 114 by server 104.

Platform 106 provides enhanced services to the user of the gaming application 114 during the enhanced services session at step 406. In particular, platform 106 may provide event management services, described in more detail with reference to FIG. 8; statistics generation, described in more detail with reference to FIG. 9; and user profiling services, described in more detail with reference to FIG. 10. Platform 106 may further match players in an "intelligent lobby", as described further in FIG. 11; provide game advice, as described further in FIG. 12; and provide wagering services, as described further in FIGS. 13 and 14. In this regard, platform 106 enriches the gaming experience of users participating in gaming applications 114 hosted by servers 104.

A particular advantage of system 10 is that platform 106 may simultaneously conduct enhanced services sessions with many clients 102 using the same or different servers 104. Therefore, steps 400*a*, 402*a*, and 404*a* illustrate that platform 106 conducts a first enhanced services session with a client 102 coupled to a first server. Steps 400*b*, 402*b*, and 404*b* illustrate that platform 106 conducts additional enhanced services sessions with any number of additional clients 102 coupled to the same or different servers 104. These additional enhanced services sessions may overlap in time with any portion of any other enhanced services session conducted by platform 106.

Figure 8:
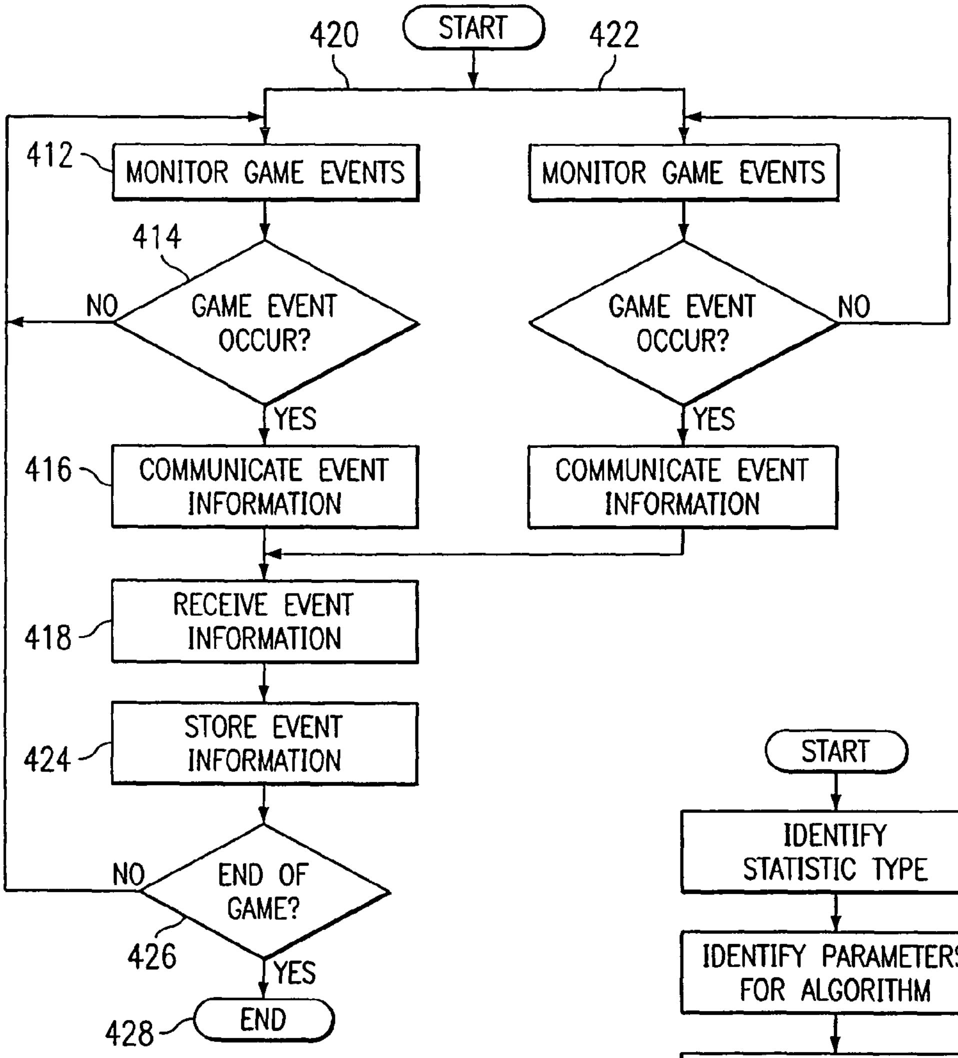
FIG. 8 illustrates one embodiment of a method for providing game event management services.

FIG. 8 illustrates a flowchart of an exemplary method for providing game event management services. The method begins at step 412, where a server 104 monitors a plurality of game events 120. At step 414, the server 104 determines whether a game event 120 has occurred. If no game event 120 has occurred, as determined at step 414, execution returns to step 412. If a game event 120 has occurred, execution proceeds to step 416 where the server 104 communicates event information 122. In a particular embodiment, server 104 processes event information 122 prior to communicating it to platform 106. At step 418, platform 106 receives event information 122 and may process it accordingly. For example, platform 106 may filter, format, or otherwise process event information 122 to generate event information 152.

A particular advantage of system 10 is that platform 106 may conduct enhanced services sessions with many clients 102 using the same or different servers 104. With respect to game event management services, therefore, event manager 130 may receive first event information 122 from a first server 104 monitoring the game events 120 of a first set of clients 102, as described with reference to first path 420. Event manager 130 may further receive event information 122 from any number of other servers 104, as illustrated with reference to path 422. For example, event manager 130 may receive second event information 122 from a second server 104 monitoring the game events 120 of a second set of clients 102. Memory 150 stores first event information 152 and second event information 152, at step 424. Event manager 130 determines whether the particular gaming application 114 being monitored has ended at step 426. If not, execution returns to step 412. If so, execution terminates at step 428. Event information 152 may be used by other modules of platform 106 to provide enhanced services to users of system 10.

Figure 9:
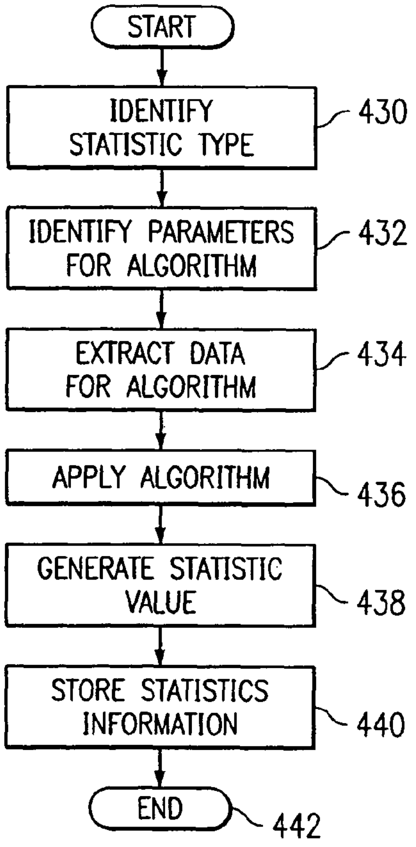
FIG. 9 illustrates one embodiment of a method for generating statistics information.

FIG. 9 illustrates a flowchart of an exemplary method for generating statistics information 154. The method begins at step 430, where statistics manager 132 identifies the type of statistic to be generated. For the particular statistic type identified at step 430, statistics manager 132 identifies the parameters to be used for the corresponding statistic algorithm, at step 432. The statistic algorithm sorts, analyzes, or otherwise processes data to define one or more quantitative and/or qualitative characteristics about a gaming application 114, a user of a gaming application 114, or both. Statistics manager 132 extracts the appropriate data for the statistic algorithm, at step 434. For example, statistics manager 132 may extract event information 152 from memory 150 and/or previously generated statistics information 154 from memory 150. Statistics manager 132 applies the appropriate statistics algorithm at step 436 and generates a statistic value at step 438. Memory 150 stores the resulting statistics information 154 in an appropriate record associated with either or both of gaming application 114 and a user of gaming application 114. Execution terminates at step 442. Statistics information 154 may be used by other modules of platform 106 to provide enhanced services to users of system 10.

Figure 10:
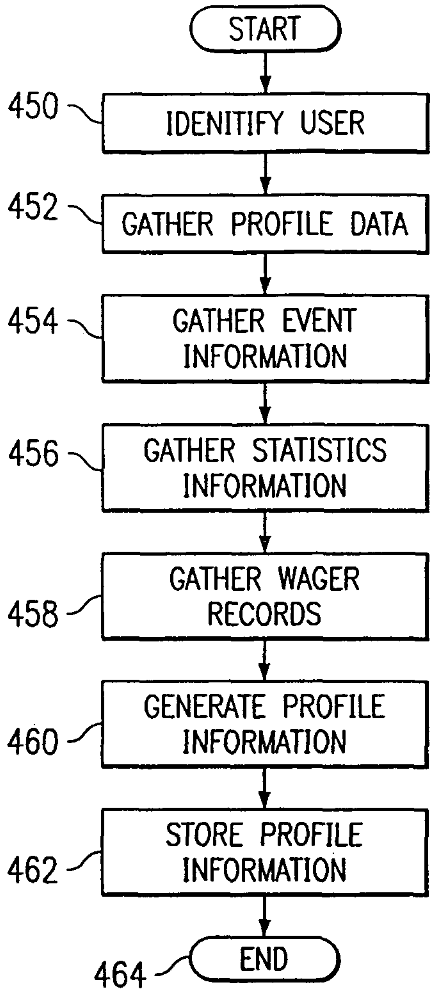
FIG. 10 illustrates one embodiment of a method for generating profile information.

FIG. 10 illustrates a flowchart of an exemplary method for generating profile information 156. The method begins at step 450 where profile manager 134 identifies an appropriate user for whom profile information 156 will be generated. Profile manager 134 gathers profile data entered by the user at step 452. Examples of such profile data include account information, selection criteria, and various other user attributes provided by the user. At step 454, profile manager 134 gathers the event information 152 associated with the user identified at step 450. Examples of such event information include various user attributes gleaned from game events 120 performed by the user during the execution of a gaming application 114. At step 456, profile manager 134 gathers statistics information 154 associated with the user. At step 458, profile manager 134 gathers wager records 158 associated with the user. Profile manager 134 generates profile information 156 for the user at step 460 based upon any combination of the information gathered at steps 452 through 458. As described above, profile manager 134 may generate and/or update profile information 156 for particular users of system 10 over time. Memory 150 stores profile information 156 at step 462 in an appropriate record associated with the user. Execution terminates at step 464. The other components of platform 106 may use profile information 156 to provide enhanced services to users of system 10.

Figure 11:
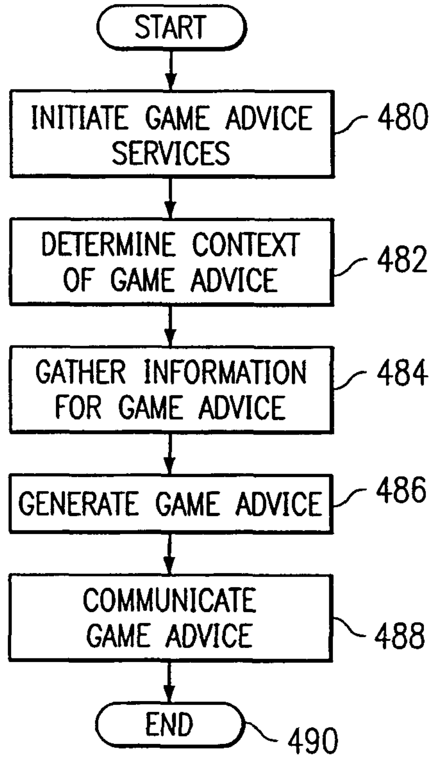
FIG. 11 illustrates one embodiment of a method for providing game advice.

FIG. 11 illustrates a flowchart of an exemplary method for providing game advice to users of system 10. The method begins at step 480 where game advisor 138 initiates game advice services on behalf of one or more users of system 10. The game advice services may be initiated in response to a request by a particular user, the occurrence of a particular game event 120, event information 152, a wager, or any other suitable trigger. Execution proceeds to step 482 where game advisor 138 determines the context of the game advice. For example, game advisor 138 determines any combination of the gaming application 114 for which the game advice will be provided; the state of the gaming application 114; the participants in the gaming application 114 such as, for example, the user issuing a request for game advice, the opponent, and any other participants of the gaming application 114; and any relevant wagers currently in place involving any of the participants of the gaming application 114.

At step 484, game advisor 138 gathers information used to generate the game advice. Examples of this information include event information 152 associated with the gaming application 114 for which the game advice will be provided. This event information 152 may be associated with the current execution of the gaming application 114, or any previous execution of the gaming application 114, on the same or different server 104 by the same or different user. Game advisor 138 may further gather event information 152 associated with other gaming applications 114 currently or previously executed on the same or different server 104 by the same or different user. In this regard, game advisor 138 may analyze event information 152 from any combination of users, opponents, or other participants of the same or different gaming application 114 currently being executed or previously executed on the same or different server 104. In addition to event information 152, game advisor 138 may gather statistics information 154, profile information 156, and wager records 158 associated with any combination of users of system 10.

Execution proceeds to step 486, where game advisor 138 generates game advice based upon any combination of information gathered at step 484. In a particular embodiment, the game advice comprises wager advice such as, for example, whether to place and/or accept a wager, the parameters of the wager, and any other suitable wager-related information. Game advisor 138 communicates the game advice to one or more users at step 488. In general, the game advice is communicated during the execution of a gaming application 114 for which the game advice is provided. Execution terminates at step 490.

Figure 12:
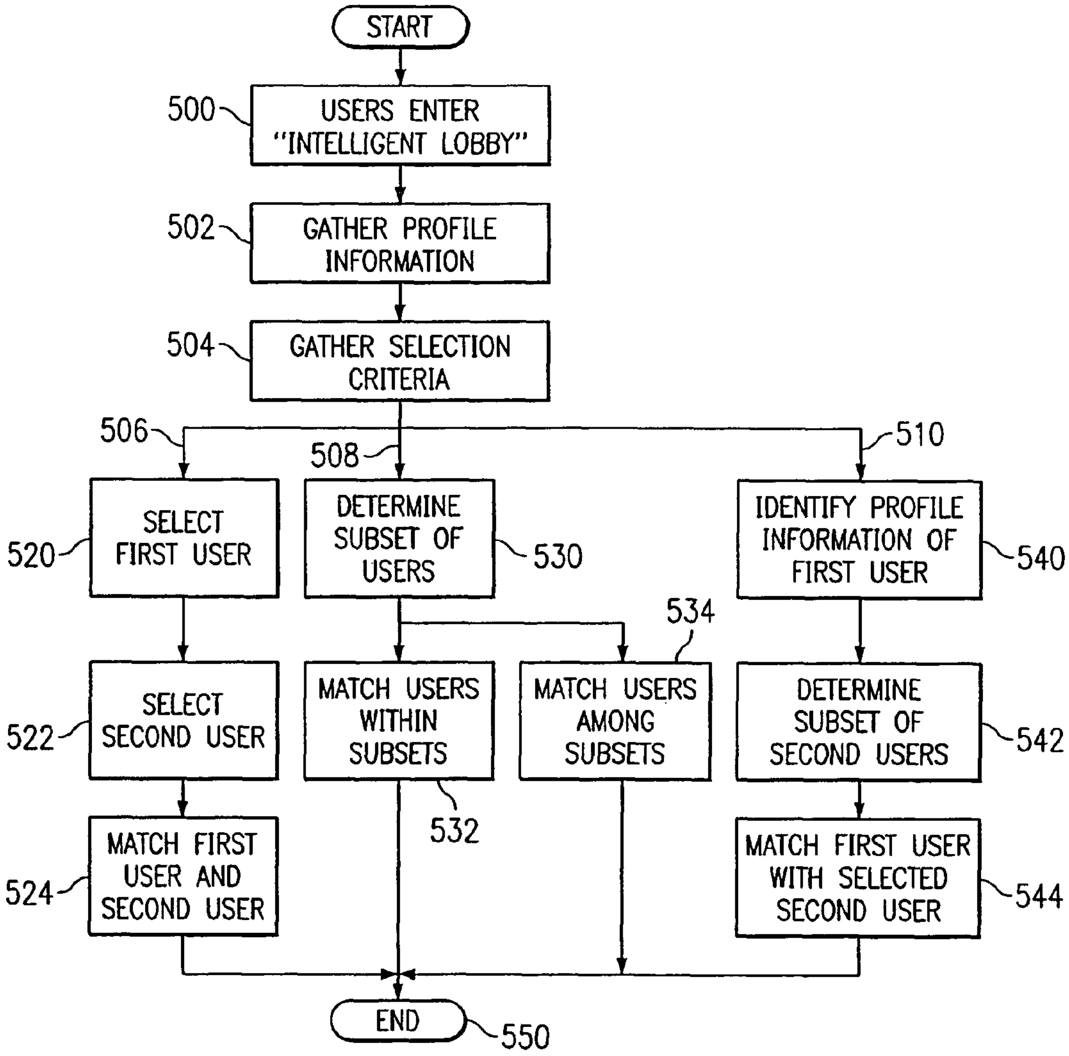
FIG. 12 illustrates one embodiment of a method for matching users.

FIG. 12 illustrates a flowchart of an exemplary method for matching users of system 10 in a competition associated with the execution of a gaming application 114. The method begins at step 500 where users of system 10 enter an "intelligent lobby". "The intelligent lobby" may be associated with one or more gaming applications 114. At step 502, lobby manager 136 gathers profile information 156 for any number and combination of users in system 10. For example, lobby manager 136 may gather profile information 156 such as statistics information 154, wagering parameters 276, and user characteristics 278 associated with particular users of system 10. At step 504, lobby manager 136 gathers selection criteria 280 for any number and combination of users of system 10. Selection criteria 280 is used to select prospective opponents for a particular user and may be provided by a user upon entering the "intelligent lobby," may be stored in profile information 156, or both. Upon gathering profile information 156 and selection criteria 280, lobby manager 136 matches users in a competition associated with the execution of a particular gaming application 114 using one or more different matching techniques, as illustrated by paths 506, 508, and 510.

Referring to path 506, lobby manager 136 selects a first user at step 520 based upon, for example, profile information 156 associated with the first user and/or selection criteria 280 associated with any other user of system 10. Lobby manager 136 selects a second user at step 522 based upon, for example, profile information 156 associated with the second user and/or selection criteria 280 associated with the first user selected at step 520. Execution proceeds to step 524, where lobby manager 136 matches the first user selected at step 520 against the second user selected at step 522 in a competition associated with the execution of a particular gaming application 114 based upon profile information 156 and/or selection criteria 280 of the first and second users.

Referring to path 508, lobby manager 136 determines subsets of users at step 530 based upon, for example, profile information 156. For example, lobby manager 136 may determine a first subset of users and a second subset of users. From here, lobby manager 136 may match users from within particular subsets against each other in a competition associated with the execution of the gaming application 114, at step 532. For example, lobby manager 136 may match first and second users from the first subset of users and match third and fourth users from the second subset of users.

Alternatively, or in addition, lobby manager 136 may match users from among different subsets against each other in a competition associated with the execution of the gaming application 114, at step 534. For example, lobby manager 136 may match a first user from the first subset of users with a second user from a second subset of users. In this regard, lobby manager 136 may establish a tournament for a particular gaming application in which several users compete against each other in multiple rounds of competition. The users are generally selected based upon profile information 156 and/or selection criteria 280 associated with any combination of users.

Referring to path 510, lobby manager 136 identifies profile information 156 associated with a particular first user at step 540. Lobby manager 136 determines a subset of second users based upon, for example, selection criteria 280 and profile information 156, at step 542. For example, lobby manager 136 may determine the subset of second users by comparing selection criteria 280 associated with the first users identified at step 540 with profile information 156 associated with all of the other users. In another embodiment, lobby manager 136 determines the subset of second users by comparing selection criteria 280 associated with the second users with profile information 156 associated with the first user identified at step 540. In yet another embodiment, lobby manager 136 determines the subset of second users based at least in part upon profile information 156 associated with the first user and the second users, and selection criteria 280 associated with the first user and the second users.

At step 544, lobby manager 136 matches the first user selected at step 540 against a selected second user from the subset of second users selected at step 542. In one embodiment, lobby manager 136 selects the second user according to profile information 156 and selection criteria 280. In another embodiment, the first user identified at step 540 selects from among the subset of second users determined at step 542. In this regard, a user of system 10 can enter an "intelligent lobby" associated with a gaming application 114 and be presented with a list of suitable opponents from which the first user may select a particular opponent. Execution terminates at step 550.

Figure 13:
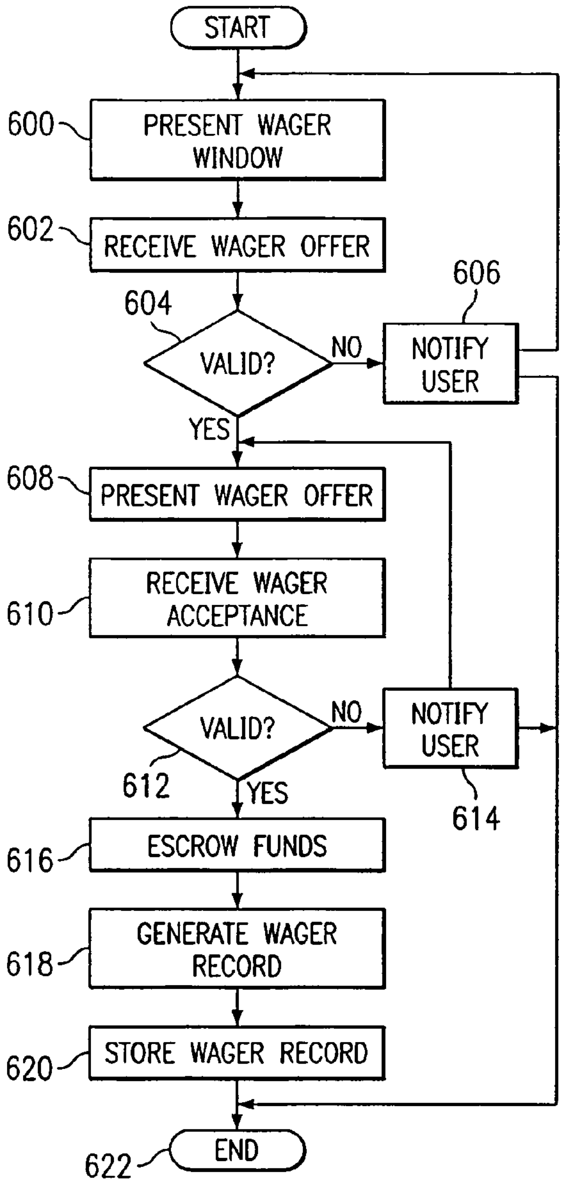
FIG. 13 illustrates one embodiment of a method for establishing a wager.

FIG. 13 illustrates a flowchart of an exemplary method for establishing a wager between users of system 10. The method begins at step 600 where wager manager 140 presents a wager window to the user of a gaming application 114. The wager window may be presented at any time before, during, or after the execution of a particular gaming application 114. For example, wager manager 140 may present the wager window to a user of a gaming application 114 in response to a particular game event 120, in response to a request to place a wager by a particular user of a gaming application 114, or in response to any other suitable trigger.

At step 602, wager manager 140 receives a wager offer by a user of a gaming application 114. In one embodiment, the wager offer is generated by the user using the wager window presented at step 600. Wager manager 140 determines whether the wager offer received at step 602 is valid at step 604 based upon, for example, financial information stored in memory 150 and associated with the particular user that generated the wager offer. If the wager offer is invalid, as determined at step 604, wager manager 140 notifies the user at step 606. From here, execution either proceeds to step 600 where wager advisor 140 presents another wager window to the user so that the user may generate a new, valid, wager offer, or execution terminates at step 622. If the wager offer received at step 602 is determined to be valid at step 604, wager manager 140 presents the wager offer to a plurality of users of system 10 at step 608.

The particular users to whom the wager offer is presented may comprise any suitable subset of all users of system 10 based upon, for example, profile information 156 and/or selection criteria 280. In this regard, wager manager 140 presents the wager offer to those users of system 10 that are most likely to accept the wager. Wager manager 140 receives one or more wager acceptances at step 610. The wager offer and a wager acceptance combine to form a wager between a first user and a second user.

It should be understood that the first user and the second user may comprise players of a particular gaming application 114, spectators of a particular gaming application 114, or any other users of system 10. In one embodiment, at least one of the wager offer and the wager acceptance is received during the execution of a gaming application 114. In this regard, wager manager 140 facilitates intra-game wagering.

Wager manager 140 determines whether the wager acceptance received at step 610 is valid at step 612 based upon, for example, financial information associated with the user that accepted the wager offer. If the wager acceptance is determined to be invalid at step 612, execution proceeds to step 614 where a wager manager 140 notifies the user. From here, execution may return to step 608 where wager manager 140 may present the wager offer to users of system 10, or execution may terminate at step 622.

If the wager acceptance is determined to be valid at step 612, execution proceeds to step 616 where wager manager 140 reserves funds from each of the user's accounts into an escrow account. Wager manager 140 then generates a wager record 158 associated with the wager between the first user and the second user, at step 618.

The wager record 158 generally comprises a first user identifier, a second user identifier, and a plurality of wager parameters. For example, the wager parameters may include a wager event, a wager value, and wager conditions. The wager event generally comprises an action performed during the execution of a gaming application 114 that changes the state of the gaming application 114 and upon which the outcome of the wager between the first user and the second user is determined. Memory 150 stores the wager record 158 at step 620 according to a wager record identifier 270. Execution terminates at step 622.

Figure 14:
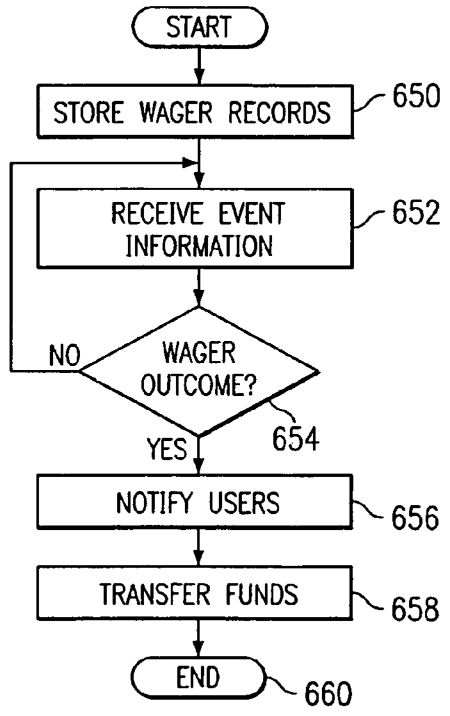
FIG. 14 illustrates one embodiment of a method for settling a wager.

FIG. 14 illustrates a flowchart of an exemplary method for settling a wager between users of system 10. The method begins at step 650 where memory 150 stores a plurality of wager records 158. At least one wager record 158 is between a first user and a second user. Each wager record 158 generally comprises a plurality of wager parameters, such as, for example, a wager event, a wager value, and wager conditions. Wager manager 140 receives event information 152 (or 122) at step 652. In general, the event information 152 (or 122) is received during the execution of a corresponding gaming application 114. In this regard, wager manager 140 uses intra-game data to verify the winner or loser of a wager, and thereby supports intra-game wagering.

Execution proceeds to step 654 where wager manager 140 determines whether the outcome of the wager is decided by event information 152 (or 122). In general, wager manager 140 determines the outcome of the wager at step 654 based upon wager parameters of the wager record 158 and event information 152 (or 122). For example, wager manager 140 determines the outcome of the wager by cross-referencing event information 152 (or 122) with wager parameters associated with the wager record 158. If the wager parameters necessary to determine the winner of the wager are not satisfied, as determined at step 654, execution returns to step 652 where wager manager 140 continues to receive event information 152 (or 122). If the wager parameters necessary to determine the winner of the wager are satisfied, as determined at step 654, execution proceeds to step 656 where wager manager 140 notifies the first and second users. A particular advantage of system 10 is that automatic verification of wagers based upon event information 152 (or 122) and wager parameters eliminates the problems associated with trust-based wagering systems. This type of automatic verification of wagers not only makes wagering easier, but it allows users to generate more detailed, intra-game, wagers.

Execution proceeds to step 658 where funds manager 142 transfers funds between an account of the first user and an account of the second user that participated in the determined wager. In one embodiment, funds manager 142 transfers the funds during the execution of the gaming application 114. In another embodiment, funds manager 142 transfers funds based upon the outcome of one or more other wagers between the first user and the second user. Execution terminates at step 660.

As described above, platform 106 may conduct enhanced services sessions with many clients 102 using the same or different servers 104. In one embodiment, a single server 104 may host multiple gaming applications 114 that are the subject of separate wagers. Various event information 152 associated with this server 104 may therefore be used by wager manager 140 to determine the outcomes of these separate wagers.

In another embodiment, separate servers 104 may host the same or different gaming application 114 that is the subject of separate wagers. Therefore, memory 150 may store a number of wager records 158 associated with users of clients 102 coupled to the same or different servers 104. These wager records 158 generally include a server identifier 306 indicating which servers 104 will communicate the event information 152 that may determine the outcome of the wager. With respect to settling wagers, wager manager 140 may receive first event information 152 associated with a first server 104 and second event information 152 associated with a second server 104. Wager manager 140 may then determine the outcome of a first wager based at least in part upon the first event information 152 and may determine the outcome of a second wager based at least in part upon the second event information 152.

To facilitate the determination of various wagers, the first event information 152 may further be associated with an identifier of the first server 104 and the second event information 152 may be associated with an identifier of the second server 104. In this regard, wager manager 140 may identify a first subset of wager records 158 using server identifier 306 and the identifier of the first server 104, and wager manager 140 may identify a second subset of wager records 158 using server identifier 306 and the identifier for the second server 104. In this regard, wager manager 140 can quickly filter through event information 152 to identify the event information 152 that is relevant for determining the outcome of a particular wager record 158.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶6 of 35 U.S.C.§112 as it exists on the date of filing hereof unless "means for" or "step for" are used in the particular claim.

What is claimed is:

1. A system for establishing a wager associated with an online game that is played by a first participant user and a second participant user, comprising:

a processor associated with one or more servers that provide access to the game for a plurality of users;

the processor operable at least to:

receive information about a first wager offer from the first participant user via a first graphical user interface of an input device used by the first participant user, in which the information received about the first wager offer comprises information identifying the second participant user;

cause the first wager offer from the first participant user to be communicated to the second participant user via a second graphical user interface of an output device used by the second participant user;

receive information about a first wager acceptance from the second participant user via the second graphical user interface of an input device used by the second participant user, the first wager offer from the first participant user and the first wager acceptance from the second participant user combining to form a first wager between the first participant user and the second participant user, wherein the first wager has a first outcome based on at least one event associated with the game;

cause information about the first wager acceptance to be communicated to the first participant user via a first graphical user interface of an output device used by the first participant user;

receive information about a second wager offer from a spectator user via an input device used by the spectator user;

receive information about a second wager acceptance of the second wager offer from a player, the second wager offer and the second wager acceptance combining to form a second wager between the spectator user and the player, wherein the second wager has a second outcome based on at least one event associated with the game;

automatically execute, by a wager manager, a verification process to automatically verify wagers based upon event information and wager parameter and using intra-game data to verify a winner or loser of a wager and to allow automatic transfer of funds to winners of wagers, and the wager manager further to allow the plurality of users to generate wagers before, during, or after execution of a gaming application associated with the game, and the wager manager further to communicate with the plurality of users to generate a graphical user interface (GUI) to the plurality of user without requiring the plurality of users to navigate to another GUI of another server dedicated to establishing wagers;

execute a gaming application that allows users to participate in the game and that generates event information associated with the game while the game is played by the first participant user and the second participant user;

while the game is played by the first participant user and the second participant user, after the game has started and before the game ends:

generate statistics information related to at least the first participant user and the second participant user;

cause at least a portion of the statistics information related to the first participant user to be presented to the second participant user via a respective computing device of the second participant user, the respective computing device of the second participant user being in electronic communication with the processor; and cause at least a portion of the statistics information related to the second participant user to be presented to the first participant user via a respective device of the first participant user, the respective device of the first participant user being in electronic communication with the processor;

determine the first outcome of the first wager and the second outcome of the second wager from one or more events associated with the game;

cause information about at least one of (1) a ranking of a third participant user and (2) a skill level of the third participant user to be presented to the first participant user via the respective computing device of the first participant user;

communicate information to the first graphical user interface of the device associated with the first participant user, the second graphical user interface of the device associated with the second participant user, and a third graphical user interface of the device associated with the spectator user;

cause funds to be transferred to a winner of the first wager;

cause funds to be transferred to a winner of the second wager, wherein the at least one window is displayed during the execution of the gaming application therewith; and a memory communicatively coupled to the processor and that stores information associated with (1) the first and second wagers and (2) the one or more events, wherein at least one of the first wager offer from the first participant user and the first wager acceptance is received while the game is played by the first participant user and the second participant user;

a profile manager to monitor player participation in execution of gaming applications and generate player profile information based on player participation; and a lobby processor to match players engaged in execution of gaming applications based on the player profile information and allow the matched players to engage in execution of gaming applications against each other.

2. The system of claim 1, wherein the processor is associated with a handheld device, a wireless telephone, or a personal digital assistant.

3. The system of claim 1, wherein the game comprises one of a golf game, poker game, fight, role-playing game, massively multiplayer game, car driving game, strategy game, board game, chess game, dice game, and backgammon.

4. A system for establishing a wager associated with an online game that is played by a first participant user and a second participant user, comprising:

a processor of one or more servers that provide access to the game for a plurality of users, the one or more servers being in electronic communication with at least one computer via an electronic communications network;

the processor operable at least to:

receive information during the game after the game has started and before the game ends about a first wager offer from a first graphical user interface of a first computing device of the first participant user, in which the information received about the first wager offer comprises information identifying the second participant user;

receive information about a first wager acceptance from a second graphical user interface of a computing device of the second participant user after the game has started and before the game ends, the first wager offer from the first participant user and the first wager acceptance from the second participant user combining to form a first wager between only the first participant user and the second participant user, wherein the first wager has a first outcome based on at least one event associated with the game;

receive information about a second wager offer from a spectator user;

receive information about a second wager acceptance of the second wager offer, the second wager offer from the spectator user and the second wager acceptance combining to form a second wager between the spectator user and the one of a player and the spectator user, wherein the second wager has a second outcome based on at least one event associated with the game;

automatically execute, by a wager manager, a verification process to automatically verify wagers based upon event information and wager parameter and using intra- game data to verify a winner or loser of a wager and to allow automatic transfer of funds to winners of wagers, and the wager manager further to allow the plurality of users to generate wagers before, during, or after execution of a gaming application associated with the game, and the wager manager further to communicate with the plurality of users to generate a graphical user interface (GUI) to the plurality of user without requiring the plurality of users to navigate to another GUI of another server dedicated to establishing wagers;

execute a gaming application that allows users to participate in the game and that generates event information associated with the game while the game is played by the first participant user and the second participant user;

while the game is played by the first participant user and the second participant user:

generate statistics information related to at least the first participant user and the second participant user;

cause at least a portion of the statistics information related to the first participant user to be presented to the second participant user via a respective device of the second participant user, the respective device of the second participant user being in electronic communication with the processor; and cause at least a portion of the statistics information related to the second participant user to be presented to the first participant user via a respective computing device of the first participant user, the respective computing device of the first participant user being in electronic communication with the processor; and determine the first outcome of the first wager and the second outcome of the second wager from one or more events associated with the game; and a memory communicatively coupled to the processor and that stores (1) information associated with the first and second wagers and (2) the one or more events;

wherein the processor communicates information the first participant user, the second participant user, and the spectator user, wherein the processor to cause funds to be transferred to a winner of the first wager, wherein the processor to cause funds to be transferred to a winner of the second wager; and a profile manager to monitor player participation in execution of gaming applications and generate player profile information based on player participation; and a lobby processor to match players engaged in execution of gaming applications based on the player profile information and allow the matched players to engage in execution of gaming applications against each other.

5. A method, comprising:

receiving, by a processor of at least one computer in electronic communication with at least one other computer via an electronic communications network, via a first graphical user interface of a first computing device, a first wager offer from a first participant user, in which the act of receiving the first wager offer comprises receiving information identifying a second participant user;

causing, by the processor, the first wager offer to be displayed via a second graphical user interface of a second computing device, at an electronic display device of the second participant user, the electronic display device being in electronic communication with the processor;

receiving, by the processor, from the second graphical user interface of the second computing device of the second participant user a first wager acceptance of the first wager offer, the first wager offer and the first wager acceptance combining to form a first wager between only the first participant user and the second participant user, wherein the first wager has a first outcome based on at least one event associated with a game;

receiving, by the processor, a second wager offer from a spectator user;

receiving from a user a second wager acceptance of the second wager offer, the second wager offer and the second wager acceptance combining to form a second wager, wherein the second wager has a second outcome based on at least one event associated with the game, and wherein the second wager acceptance is received by the processor;

communicating information to the first graphical user interface associated with the first participant user, the second graphical user interface associated with the second participant user, and a third graphical user interface associated with the spectator user;

causing funds to be transferred to a winner of the first wager; and causing funds to be transferred to a winner of the second wager;

automatically executing, by a wager manager, a verification process to automatically verify wagers based upon event information and wager parameter and using intra-game data to verify a winner or loser of a wager and to allow automatic transfer of funds to winners of wagers, and the wager manager further to allow the plurality of users to generate wagers before, during, or after execution of a gaming application associated with the game, and the wager manager further to communicate with the plurality of users to generate a graphical user interface (GUI) to the plurality of user without requiring the plurality of user to navigate to another GUI of another server dedicated to establishing wagers;

executing, by the processor, a gaming application that allows users to participate in the game and that generates event information associated with the game while the game is played by the first participant user and the second participant user;

while the game is played by the first participant user and the second participant user:

generate statistics information related to at least the first participant user and the second participant user;

cause at least a portion of the statistics information related to the first participant user to be presented to the second participant user via a respective computing device of the second participant user, the respective computing device of the second participant user being in electronic communication with the processor; and cause at least a portion of the statistics information related to the second participant user to be presented to the first participant user;

causing, by the processor, information about at least one of (1) a ranking of a third participant user and (2) a skill level of the third participant user to be presented to the first participant user via the device of the first participant user; and determining, by the processor, the first outcome of the first wager and the second outcome of the second wager based on events associated with the game, wherein at least one of the first wager offer and the first wager acceptance is received while the game is played by the first participant user and the second participant user, after the game has started and before the game ends; and monitoring, by a profile manager player, participation in execution of the gaming applications and generate player profile information based on player participation;

matching, by a lobby processor, players engaged in execution of the gaming applications based on the player profile information to allow the matched players to engage in execution of the gaming applications against each other.

6. The method of claim 5, wherein the processor is associated with a handheld device, a wireless telephone, or a personal digital assistant, and wherein the game played by the first participant user and the second participant user comprises a sports game a card game, or an adventure game.

7. The method of claim 5, wherein the user from whom the second wager acceptance is received comprises at least one user other than the first participant user, the second participant user, and the spectator user, and the second wager offer from the spectator user and the second wager acceptance from the at least one other user is combined to form a wager between the spectator user and the at least one other user.

8. The method of claim 7, wherein the at least one other user comprises at least one other spectator user.

9. The method of claim 7, wherein the at least one other user comprises one of the first participant user and the second participant user.

10. A non-transitory machine-readable medium having instructions stored thereon which, when executed by a processor of at least one computer in electronic communication with at least one other computer via an electronic communications network, direct the processor to:

receive a first wager offer from a first graphical user interface of a device of a first participant user;

cause the first wager offer to be displayed at a second graphical user interface of a device of a second participant user, the device being in electronic communication with the processor;

receive from the second graphical user interface of the device of the second participant user a first wager acceptance of the first wager offer, the first wager offer and the first wager acceptance combining to form a first wager between the first participant user and the second participant user, wherein the first wager has a first outcome based on at least one event associated with a game;

receive a second wager offer from a spectator user;

receive from a user a second wager acceptance of the second wager offer, the second wager offer and the second wager acceptance combining to form a second wager, wherein the second wager has a second outcome based on at least one event associated with the game;

execute a gaming application that allows users to participate in the game and that generates event information associated with the game while the game is played by the first participant user and the second participant user;

automatically execute, by a wager manager, a verification process to automatically verify wagers based upon event information and wager parameter and using intra-game data to verify a winner or loser of a wager and to allow automatic transfer of funds to winners of wagers, wherein the wager manager further to allow the plurality of users to generate wagers before, during, or after execution of a gaming application associated with the game, and the wager manager further to communicate with the plurality of users to generate a graphical user interface (GUI) to the plurality of user without requiring the plurality of user to navigate to another GUI of another server dedicated to establishing wagers;

communicate information to the first graphical user interface associated with the device of the first participant user, the second graphical user interface associated with the device of the second participant user, and a third graphical user interface associated with a device of the spectator user;

cause funds to be transferred to a winner of the first wager; and cause funds to be transferred to a winner of the second wager, generate statistics information related to at least the first participant user and the second participant user;

cause at least a portion of the statistics information related to the first participant user to be presented to the second participant user via the device of the second participant user, the device of the second participant user being in electronic communication with the processor; and cause at least a portion of the statistics information related to the second participant user to be presented to the first participant user via a respective computing device of the first participant user, the respective computing device of the first participant user being in electronic communication with the processor; and determine the first outcome of the first wager and the second outcome of the second wager based on events associated with the game, wherein at least one of the first wager offer and the first wager acceptance is received while the game is played by the first participant user and the second participant user after the game has started and before the game ends; and execute a profile manager to monitor player participation in execution of gaming applications and generate player profile information based on the player participation;

execute a lobby processor to match players engaged in the execution of the gaming applications based on the player profile information and allow the matched players to engage in the execution of the gaming applications against each other.

11. The non-transitory machine-readable medium of claim 10, wherein the processor is comprised in a handheld device, a wireless telephone, or a personal digital assistant, and wherein the game played by the first participant user and the second participant user comprises a sports game, a card game, or an adventure game.

* * * * *